US008724527B2

(12) United States Patent
Takahashi et al.

(10) Patent No.: US 8,724,527 B2
(45) Date of Patent: May 13, 2014

(54) REMOTE-CONTROL SYSTEM, REMOTE CONTROLLER, REMOTE-CONTROL METHOD, INFORMATION-PROCESSING DEVICE, INFORMATION-PROCESSING METHOD, AND PROGRAM

(75) Inventors: Naomasa Takahashi, Chiba (JP); Hidenori Karasawa, Tokyo (JP); Takayuki Shiomi, Tokyo (JP); Yasuhisa Ikeda, Chiba (JP)

(73) Assignee: Sony Corporation, Tokyo (JP)

( * ) Notice: Subject to any disclaimer, the term of this patent is extended or adjusted under 35 U.S.C. 154(b) by 753 days.

(21) Appl. No.: 11/374,187

(22) Filed: Mar. 14, 2006

(65) Prior Publication Data
US 2006/0220902 A1 Oct. 5, 2006

(30) Foreign Application Priority Data

Mar. 16, 2005 (KR) ................. 2005-075172

(51) Int. Cl.
*H04B 7/00* (2006.01)
*G06F 3/00* (2006.01)
*G06F 13/00* (2006.01)
*H04N 5/445* (2011.01)
*H04B 10/114* (2013.01)
*H04N 1/00* (2006.01)

(52) U.S. Cl.
CPC ......... *H04B 10/1141* (2013.01); *H04N 1/0035* (2013.01); *H04N 1/00352* (2013.01); *H04N 1/00384* (2013.01); *H04N 1/00392* (2013.01)
USPC .................. 370/310; 725/37; 725/40

(58) Field of Classification Search
USPC ....................................... 370/429
See application file for complete search history.

(56) References Cited

U.S. PATENT DOCUMENTS 6,107,992 A * 8/2000 Ishigaki .................. 345/158
6,130,726 A * 10/2000 Darbee et al. ............ 348/734

(Continued)

FOREIGN PATENT DOCUMENTS

GB 2402105 12/2004
JP 63-238617 10/1988

(Continued)

OTHER PUBLICATIONS

European Search Report corresponding to EP Appl. No. 06111279.3 dated Dec. 23, 2011, 6 pages.

(Continued)

*Primary Examiner* — John Blanton
*Assistant Examiner* — Christopher Crutchfield
(74) *Attorney, Agent, or Firm* — Sherr & Jiang, PLLC

(57) ABSTRACT

A remote-control system includes a remote controller which transmits the command signal corresponding to an operation performed by a user, and an information-processing device which receives the command signal and performs the processing corresponding to the command signal. The remote controller includes a sensing unit that has the sensing areas corresponding to areas provided on a screen showing an image of a video signal transmitted from the information-processing device on a one-to-one basis and that senses at least one of a touch operation and a press-down operation performed by a user for the sensing area, a generation unit that generates the command signal according to the sensing result, and a transmission unit that transmits the command signal. The information-processing device includes a reception unit that receives the command signal, and a processing unit that performs the processing corresponding to the command signal.

16 Claims, 18 Drawing Sheets

(56) References Cited

U.S. PATENT DOCUMENTS

| | | | |
|---|---|---|---|
| 6,198,481 B1 * | 3/2001 | Urano et al. | 715/835 |
| 6,288,708 B1 * | 9/2001 | Stringer | 345/169 |
| 6,765,557 B1 * | 7/2004 | Segal et al. | 345/173 |
| 7,071,865 B2 * | 7/2006 | Shibamiya et al. | 341/176 |
| 7,685,619 B1 * | 3/2010 | Herz | 725/52 |
| 2002/0070982 A1 * | 6/2002 | Hill et al. | 345/835 |
| 2002/0118131 A1 | 8/2002 | Yates et al. | |
| 2004/0041723 A1 | 3/2004 | Shibamiya et al. | |
| 2006/0033723 A1 * | 2/2006 | Maw | 345/173 |

FOREIGN PATENT DOCUMENTS

| | | |
|---|---|---|
| JP | 06-067802 | 3/1994 |
| JP | 07-295750 | 11/1995 |
| JP | 08-190456 | 7/1996 |
| JP | 08-251442 | 9/1996 |
| JP | 10-031547 | 2/1998 |
| JP | 10-200972 | 7/1998 |
| JP | 10-290488 | 10/1998 |
| JP | 11-339584 | 12/1999 |
| JP | 2001-083950 | 3/2001 |
| JP | 2001-306211 | 11/2001 |
| JP | 2002-99379 | 4/2002 |
| JP | 2002-244809 | 8/2002 |
| JP | 2002-287873 | 10/2002 |
| JP | 2003-223265 | 8/2003 |
| JP | 2003-271294 | 9/2003 |
| JP | 2003-316342 | 11/2003 |
| JP | 2004-70408 | 3/2004 |
| WO | WO 01/78054 A1 | 10/2001 |
| WO | WO 02/059868 A1 | 8/2002 |

OTHER PUBLICATIONS

Office Action of Aug. 23, 2013, for related EP application No. 06111279.3.

* cited by examiner

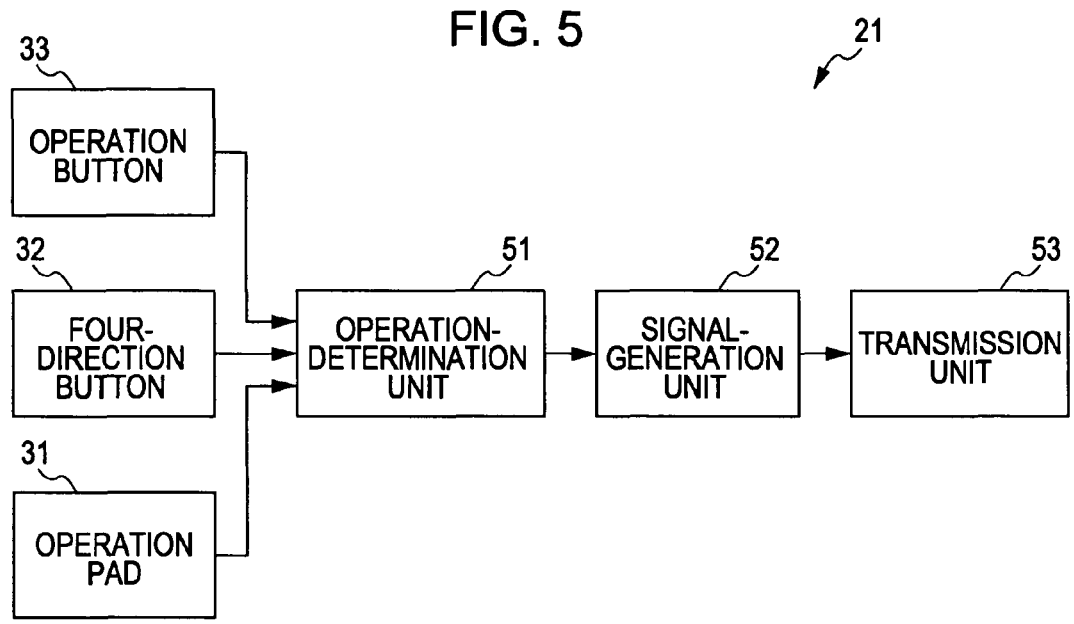
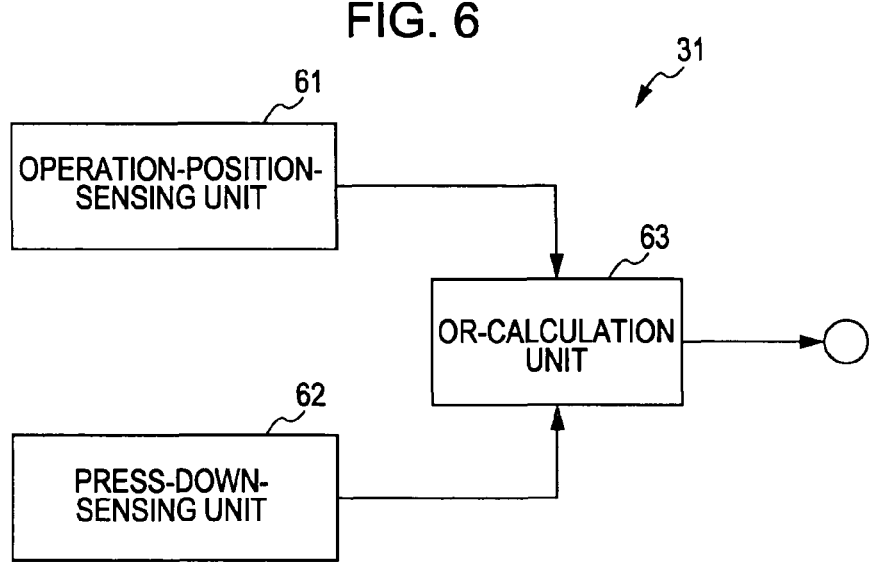

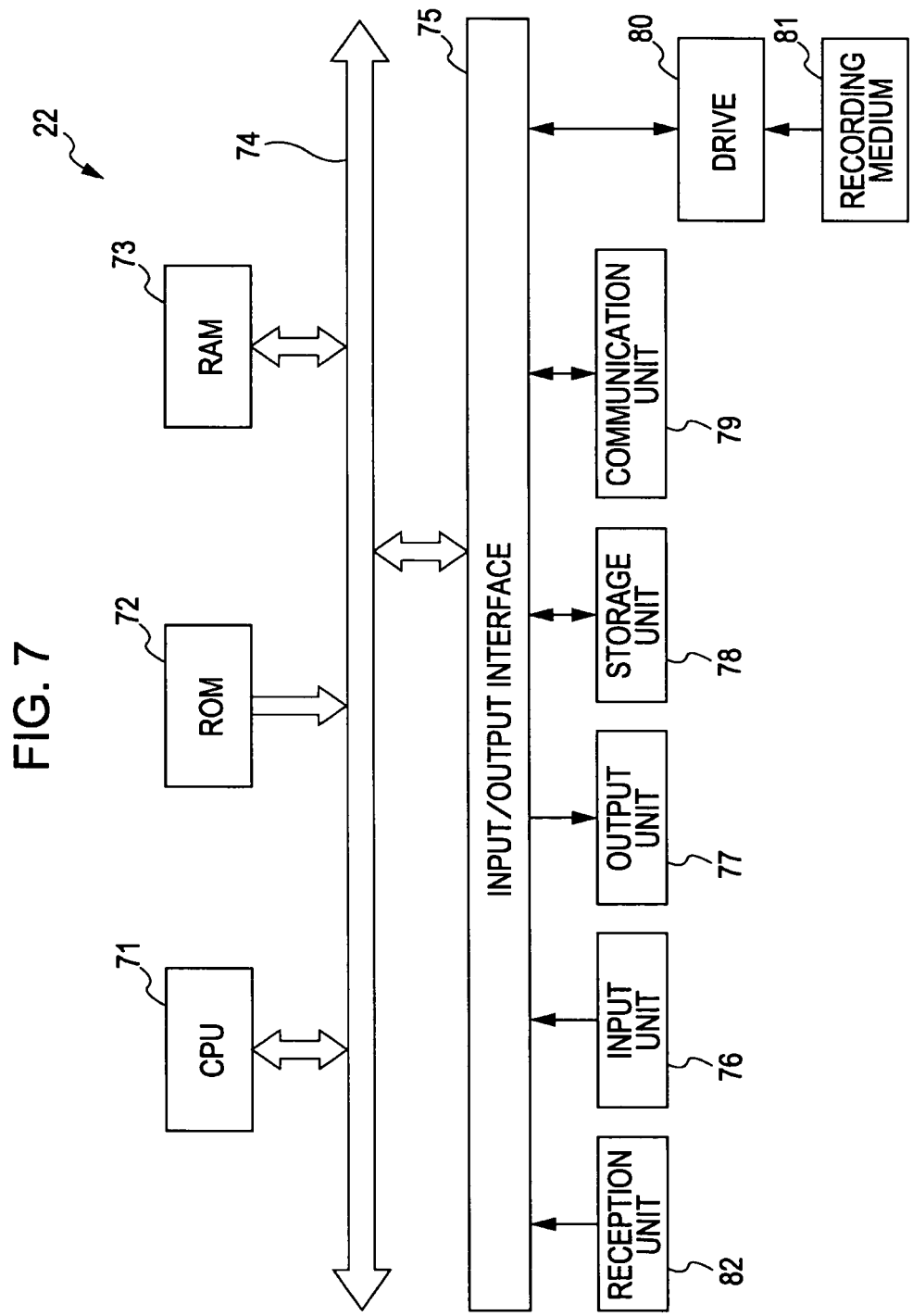

| TRAVEL PHOTO | | | | | | | |
|---|---|---|---|---|---|---|---|
| << | a | i | u | e | o | ↑ | BS |
|  | ka | ki | ku | ke | ko |  | >> |
|  | sa | si | su | se | so |  | SPACE |
| ˮ | ta | ti | tu | te | to |  | CONVER-SION |
| ° | na | ni | nu | ne | no |  | ACCEPT |
| KANA | ALPHA-BET | NUMERIC AND SYMBOL |  | OK |  | CANCEL | |

FIG. 19

| photo in L.A | ↓ | ↑ | BS |  |  |
|---|---|---|---|---|---|
| A | C | D | E | F | G |
| H | I | J | K | L | M | N |
| O | P | Q | R | S | T | U |
| V | W | X | Y | Z | SPACE |
| KANA | ALPHA-BET | NUMERIC AND SYMBOL | OK | CANCEL |

(Note: table structure approximated from figure)

REMOTE-CONTROL SYSTEM, REMOTE CONTROLLER, REMOTE-CONTROL METHOD, INFORMATION-PROCESSING DEVICE, INFORMATION-PROCESSING METHOD, AND PROGRAM

CROSS REFERENCES TO RELATED APPLICATIONS

The present invention contains subject matter related to Japanese Patent Application JP 2005-075172 filed in the Japanese Patent Office on Mar. 16, 2005, the entire contents of which are incorporated herein by reference.

BACKGROUND OF THE INVENTION

1. Field of the Invention

The present invention relates to a remote controller, a remote-control method, an information-processing device, an information-processing method, a program, and a remote-control system, and particularly relates to a remote controller, a remote-control method, an information-processing device, an information-processing method, a program, and a remote-control system that are adapted to specify a predetermined position on a display screen by using the remote controller.

2. Description of the Related Art

Hereinafter, known technologies will be described on the assumption that a cursor shown on a graphical user interface (GUI) produced on a screen of a TV receiver or the like is moved to a predetermined position by using the remote controller.

FIG. 1 shows an example software keyboard 1 shown on a screen of a TV receiver or the like, as the GUI. An input column 2 which shows a string of inputted characters and a plurality of keys 3 used for selecting a character or the like are provided on the software keyboard 1. Further, a cursor 4 (or a highlighted part) indicating which of the keys 3 is selected is shown on the software keyboard 1. In the case of FIG. 1, a key "si" is selected by the cursor 4.

In the past, four-direction buttons and/or a joystick is provided on remote controllers that can perform operations adapted to specify a predetermined position on a screen, such as an operation adapted to move the cursor 4 shown on the software keyboard 1. The above-described technology is disclosed in Japanese Unexamined Patent Application Publication No. 2004-70408, for example.

FIG. 2 shows an example external configuration of a remote controller 11 including the four-direction buttons. More specifically, the remote controller 11 has an upper-direction button 12-1, a lower-direction button 12-2, a left-direction button 12-3, and a right-direction button 12-4 that are pressed down, so as to move the cursor 4 in upper, lower, left, and right directions. Further, the remote controller 11 has an enter button 13 which is pressed down by the user, so as to input a character or the like selected by the cursor 4. Hereinafter, the above-described direction buttons 12-1 to 12-4 are collectively referred to as four-direction buttons 12.

Subsequently, the user can move the cursor 4 shown on the software keyboard 1 by keeping pressing down the four-direction buttons 12 provided on the remote controller 11.

SUMMARY OF THE INVENTION

However, if the user wishes to move the cursor 4 from one end of the screen to another end, for example, the user has to press down the four-direction buttons 12 repeatedly and/or continue pressing down the four-direction buttons 12, which is detrimental to the operability of the software keyboard 1.

Further, while the user presses down the four-direction buttons 12 repeatedly and/or continues pressing down the four-direction buttons 12, the cursor 4 often passes a desired position, which is also detrimental to the operability of the software keyboard 1.

Accordingly, the present invention allows for specifying an arbitrary position on a screen without delay by using a remote controller.

In a remote-control system according to an embodiment of the present invention, a remote controller includes a sensing unit that has a plurality of the sensing areas corresponding to a plurality of areas provided on a screen showing an image of a video signal transmitted from an information-processing device on a one-to-one basis and that senses at least one of a touch operation and a press-down operation performed by a user for the sensing area, a generation unit that generates a command signal according to a result of the sensing performed by the sensing unit, and a transmission unit that transmits the generated command signal. Further, in the remote-control system, the information-processing device includes a reception unit that receives the command signal transmitted from the remote controller and a processing unit that performs the processing corresponding to the command signal received by the reception unit.

A first remote-control method according to another embodiment of the present invention includes the steps of sensing at least one of a touch operation and a press-down operation performed by a user for a plurality of the sensing areas corresponding to a plurality of areas provided on a screen showing an image of a video signal transmitted from an information-processing device on a one-to-one basis by using a remote controller, generating a command signal according to a result of the sensing performed at the sensing step by using the remote controller, transmitting the command signal generated at the generation step by using the remote controller, receiving the command signal transmitted from the remote controller by using the information-processing device, and performing the processing corresponding to the command signal received at the reception step by using the information-processing device.

According to the remote-control system and the first remote-control method, the use of the remote controller allows for sensing at least one of the touch operation and the press-down operation performed by the user for the sensing areas that correspond to the plurality of areas on the one-to-one basis, and generating and transmitting the command signal corresponding to the sensing result. Further, the information-processing device receives the command signal transmitted from the remote controller and performs the processing corresponding to the received command signal.

A remote controller according to another embodiment of the present invention includes a sensing unit that has a plurality of the sensing areas corresponding to a plurality of areas provided on a screen showing an image of a video signal transmitted from an information-processing device on a one-to-one basis and that senses at least one of a touch operation and a press-down operation performed by a user for the sensing area, a generation unit that generates the command signal according to a result of the sensing performed by the sensing unit, and a transmission unit that transmits the generated command signal.

The remote controller may further include a plurality of detection units provided in an area surrounding the sensing unit in at least four directions including an upper direction, a lower direction, a left direction, and a right direction, so as to detect the press-down operation performed by the user. The generation unit may generate the command signal according to a result of the detection.

The sensing unit may include a position-determination unit that determines for which of the sensing areas the user performs the touch operation and a press-down-detection unit that detects for which of the sensing areas the user performs the press-down operation.

A second remote-control method according to another embodiment of the present invention includes the steps of sensing at least one of a touch operation and a press-down operation performed by a user for a plurality of the sensing areas that corresponds to a plurality of areas provided on a screen showing an image of a video signal transmitted from an information-processing device on a one-to-one basis, generating a command signal according to a result of the sensing performed at the sensing step, and transmitting the command signal generated at the generation step.

The above-described remote controllers and second remote-control method allow for sensing at least one of the touch operation and the press-down operation performed by the user for the sensing areas that correspond to the plurality of areas on the one-to-one basis, and generating and transmitting the command signal corresponding to the sensing result.

An information-processing device according to another embodiment of the present invention includes a reception unit which receives a command signal transmitted from a remote controller having a sensing unit that has a plurality of the sensing areas corresponding to a plurality of areas provided on a screen on a one-to-one basis and that senses at least one of a touch operation and a press-down operation performed by a user for the sensing area, a plurality of detection units provided in an area surrounding the sensing unit in at least four directions including an upper direction, a lower direction, a left direction, and a right direction, so as to sense the press-down operation performed by the user, a generation unit that generates the command signal according to a result of the sensing performed by the sensing unit and/or a result of the detection performed by the detection units, and a transmission unit that transmits the generated command signal, and a processing unit which performs the processing corresponding to the command signal received by the reception unit. The processing unit moves a marking indicating which of the plurality of areas is selected according to the command signal corresponding to the sensing result, or performs processing assigned to at least one of the plurality of areas, the area being selected, so as to change information shown on the screen according to the command signal corresponding to the detection result.

The processing unit can show information on the screen, the information being on a level higher or lower than a level of the information that is currently shown on the screen, according to the command signal corresponding to the detection result.

The processing unit can show information on the screen, the information preceding and/or following the information that is currently shown on the screen, according to the command signal corresponding to the detection result.

An information-processing method according to another embodiment of the present invention includes the steps of receiving a command signal transmitted from a remote controller having a sensing unit that has a plurality of the sensing areas corresponding to a plurality of areas provided on a screen on a one-to-one basis and that senses at least one of a touch operation and a press-down operation performed by a user for the sensing area, a plurality of detection units provided in an area surrounding the sensing unit in at least four directions including an upper direction, a lower direction, a left direction, and a right direction, so as to sense the press-down operation performed by the user, a generation unit that generates the command signal according to a result of the sensing performed by the sensing unit and/or a result of the detection performed by the detection unit, and a transmission unit that transmits the generated command signal, and performing the processing corresponding to the command signal received at the reception step. At the processing step, a marking indicating which of the plurality of areas is selected is moved according to the command signal corresponding to the sensing result, or processing assigned to at least one of the plurality of areas is performed, the area being selected, so as to change information shown on the screen according to the command signal corresponding to the detection result.

A program according to another embodiment of the present invention makes a computer execute processing including the steps of receiving a command signal transmitted from a remote controller having a sensing unit that has a plurality of the sensing areas corresponding to a plurality of areas provided on a screen on a one-to-one basis and that senses at least one of a touch operation and a press-down operation performed by a user for the sensing area, a plurality of detection units provided in an area surrounding the sensing unit in at least four directions including an upper direction, a lower direction, a left direction, and a right direction, so as to sense the press-down operation performed by the user, a generation unit that generates the command signal according to a result of the sensing performed by the sensing unit and/or a result of the detection performed by the detection unit, and a transmission unit that transmits the generated command signal, and performing the processing corresponding to the command signal received at the reception step. At the processing step, a marking indicating which of the plurality of areas is selected is moved according to the command signal corresponding to the sensing result, or processing assigned to at least one of the plurality of areas is performed, the area being selected, so as to change information shown on the screen according to the command signal corresponding to the detection result.

The above-described information-processing device, information-processing method, and program according to embodiments of the present invention allows for receiving the command signal transmitted from the remote controller and performing the processing corresponding to the command signal.

The present invention allows for instantly specifying an arbitrary position on a screen by using a remote controller.

BRIEF DESCRIPTION OF THE DRAWINGS

FIG. 5 is a block diagram showing an example internal configuration of the remote controller shown in FIG. 4;

FIG. 6 is a block diagram of an example configuration of an operation pad shown in FIG. 5;

FIG. 7 is a block diagram showing an example configuration of an information-processing device according to another embodiment of the present invention;

FIG. 12 shows an example display image of information in months, the image being produced on the display;

FIG. 14 shows an example display image of information in days, the image being produced on the display;

FIG. 18 shows an example display image of a software keyboard used for inputting Hiragana characters, the image being produced on the display; and FIG. 19 shows an example display image of a software keyboard used for inputting alphabetic characters, the image being produced on the display.

DESCRIPTION OF THE PREFERRED EMBODIMENTS

Before describing embodiments of the present invention, the correspondence between the features of the claims and the specific elements disclosed in the embodiments of the present invention is discussed below. This description is intended to assure that specific elements disclosed in the embodiments supporting the claimed invention are described in this specification. Thus, even if an element in an embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in embodiments are described in the claims. That is, the description does not deny the existence of aspects of the present invention that are described in embodiments but not claimed in the invention of this application, i.e., the existence of aspects of the present invention that in future may be claimed by a divisional application, or that may be additionally claimed through amendments.

Figure 1:
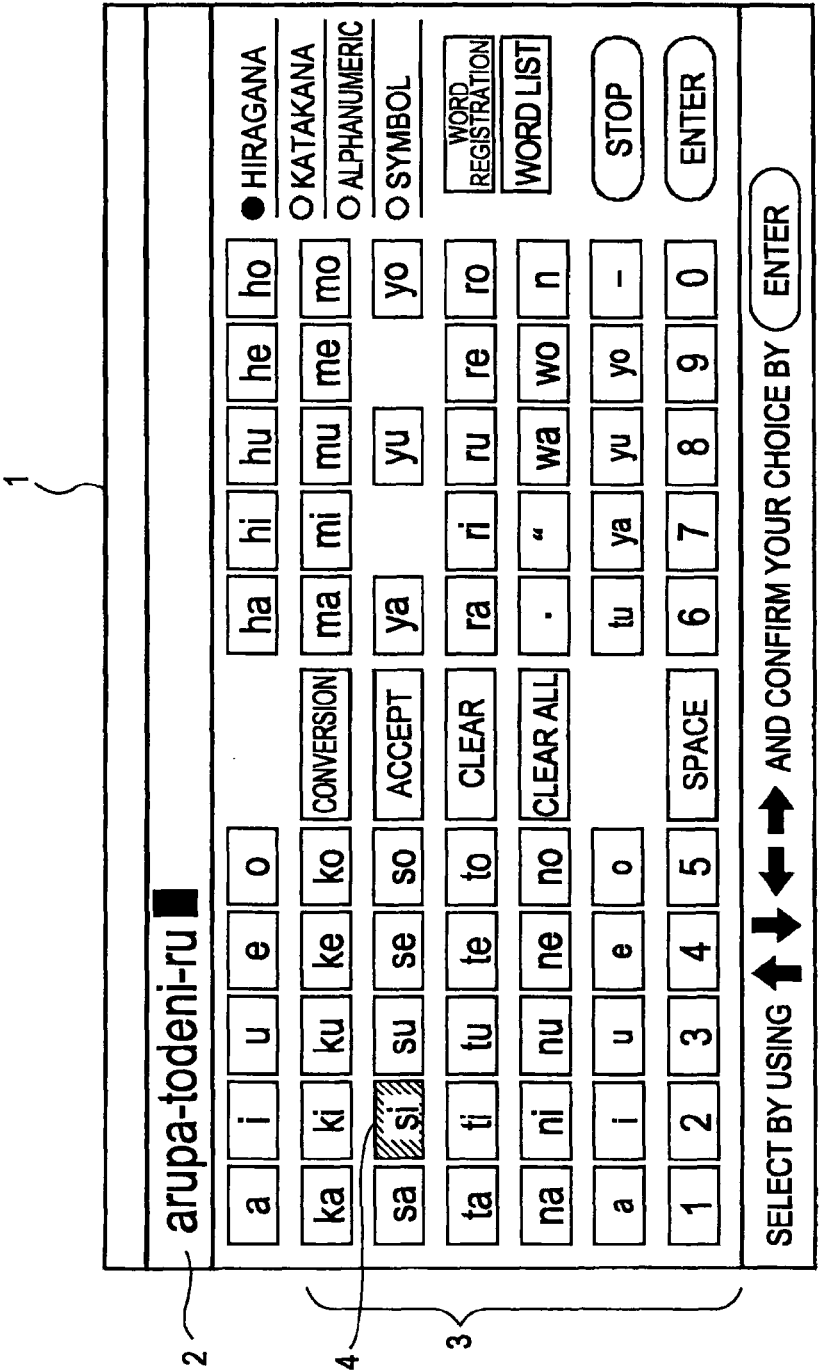
FIG. 1 shows an example display image of a known software keyboard.
Figure 2:
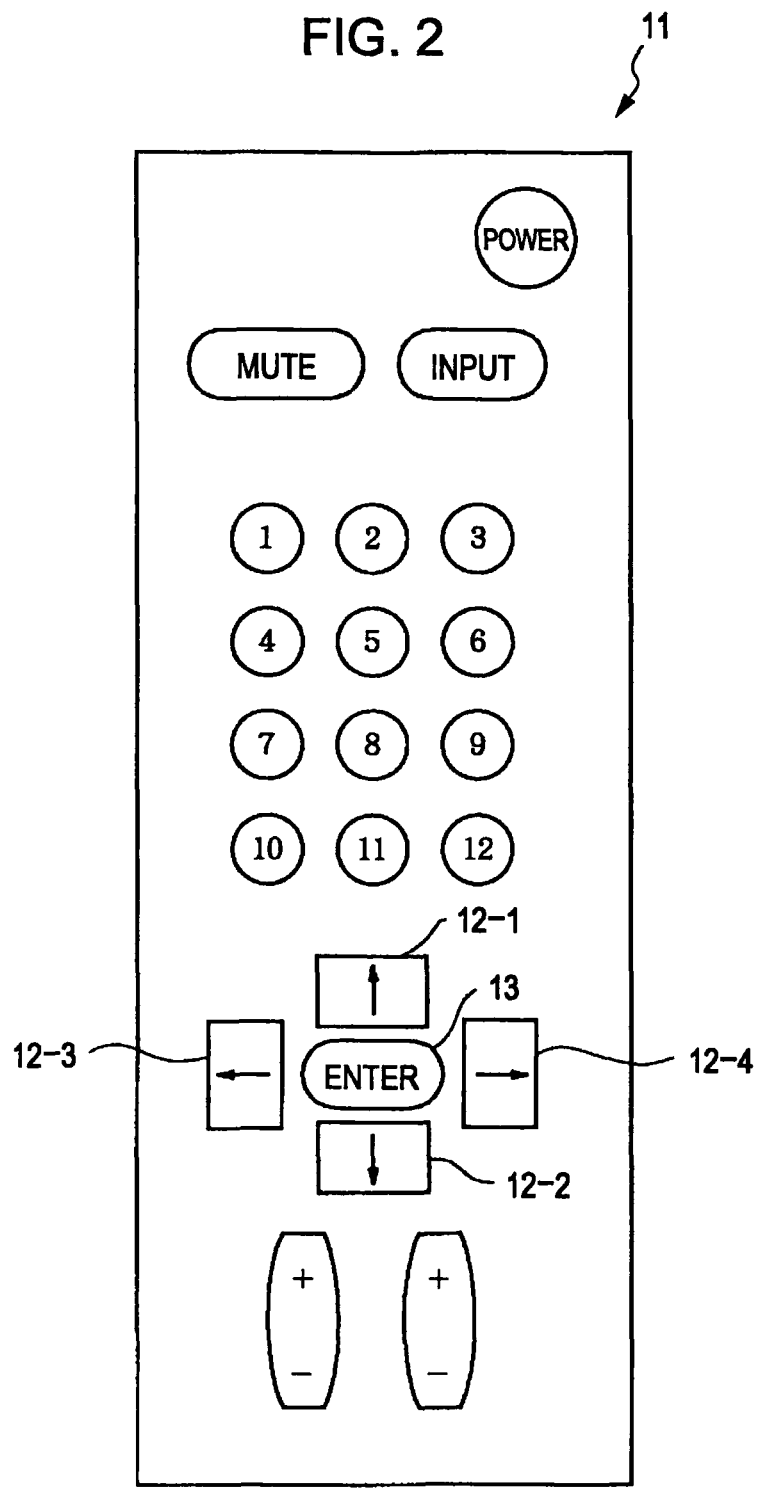
FIG. 2 shows an example external configuration of a known remote controller.
Figure 3:
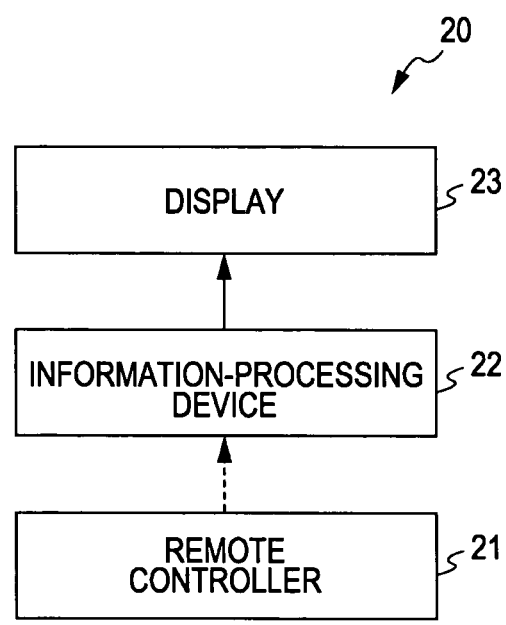
FIG. 3 is a block diagram showing an example configuration of a remote-control system according to an embodiment of the present invention.
Figure 4:
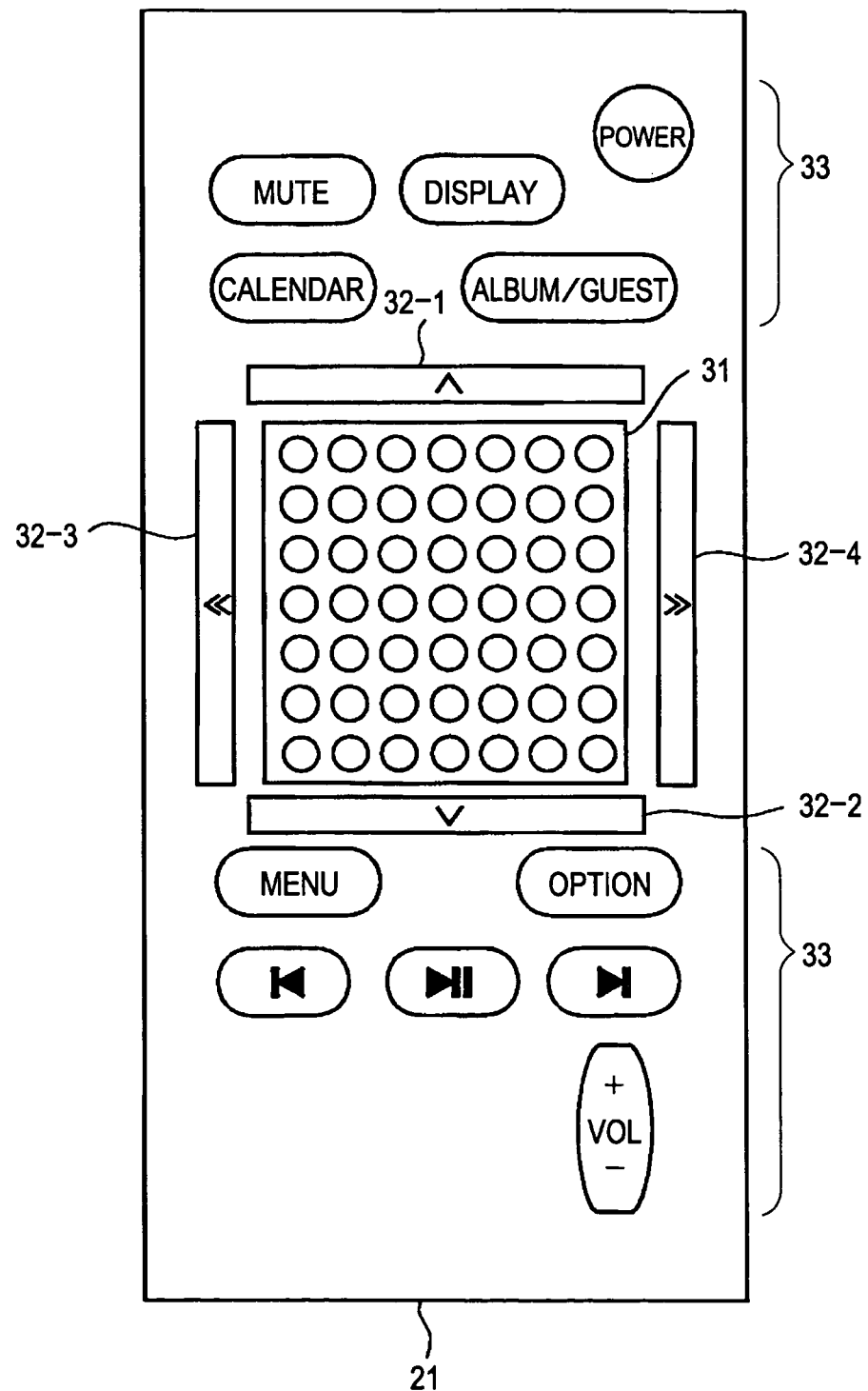
FIG. 4 shows an example external configuration of a remote controller according to another embodiment of the present invention.

In a remote-control system according to an embodiment of the present invention, e.g., a remote-control system 20 shown in FIG. 3, a remote controller such as a remote controller 21 shown in FIG. 3 includes a sensing unit such as an operation pad 31 shown in FIG. 4. The sensing unit has a plurality of the sensing areas corresponding to a plurality of areas provided on a screen which shows an image of a video signal transmitted from an information-processing device, such as an information-processing device 22 shown in FIG. 3 and senses at least one of a touch operation and a press-down operation that are performed by a user for the sensing area. The remote-controller further includes a generation unit which generates the command signal corresponding to a result of the sensing performed by the sensing unit, such as a signal-generation unit 52 shown in FIG. 5, and a transmission unit which transmits the command signal generated by the generation unit, such as a transmission unit 53 shown in FIG. 5. Further, in the remote-control system, the information-processing device 22 includes a reception unit configured to receive a command signal transmitted from the remote controller 21, such as a reception unit 82 shown in FIG. 7 and a processing unit which performs the processing corresponding to the command signal received by the reception signal, such as a CPU 71 shown in FIG. 7.

Figure 8:
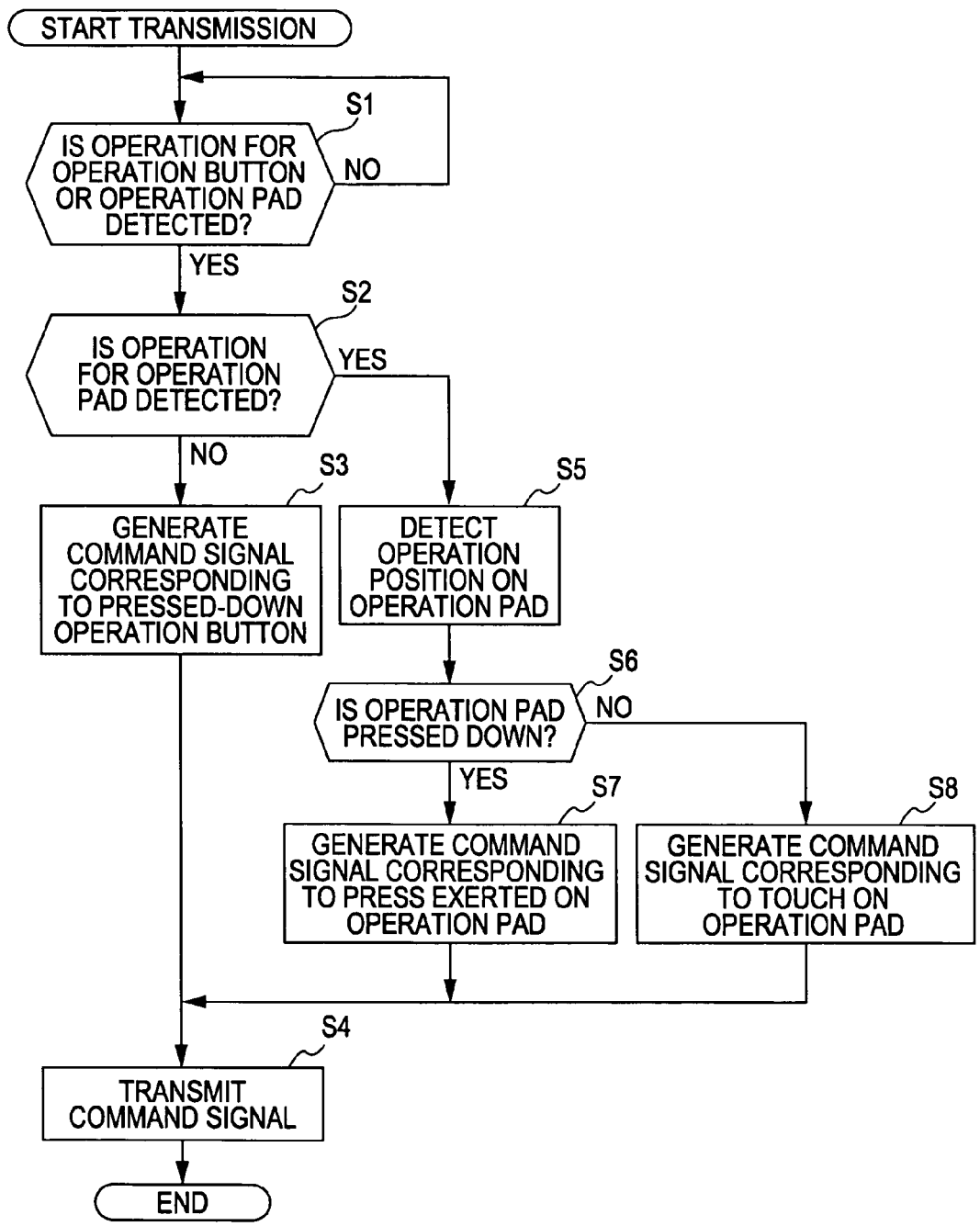
FIG. 8 is a flowchart illustrating transmission processing performed by the remote controller shown in FIG. 4.

A remote-control method according to another embodiment of the present invention includes the step of sensing at least one of a touch operation and a press-down operation that are performed by a user for a plurality of the sensing areas corresponding to a plurality of areas provided on a screen which shows an image of a video signal transmitted from an information-processing device such as the information-processing device 22 shown in FIG. 3 (step S2 of FIG. 8, for example). Further, the remote-control method includes the steps of generating the command signal corresponding to a result of the above-described sensing (step S7 shown in FIG. 8, for example), and transmitting the command signal generated at the generation step (step S4 shown in FIG. 8, for example). The above-described steps are performed by a remote controller (e.g., the remote controller 21 shown in FIG. 3). Further, the remote-control method includes the steps of receiving the command signal transmitted from the remote controller (e.g., step S11 of FIG. 9) and performing the processing corresponding to the command signal received at the reception step (e.g., step S12 of FIG. 9). The above-described steps are performed by the information-processing device 22, for example.

A remote controller according to another embodiment of the present invention (e.g., the remote controller 21 shown in FIG. 3) has a sensing unit (e.g., the operation pad 31 shown in FIG. 4) that includes a plurality of the sensing areas corresponding to a plurality of areas on one-to-one basis, where the plurality of areas is provided on a screen showing an image of a video signal transmitted from an information-processing device (e.g., the information-processing device 22 of FIG. 3), and that is configured to sense at least one of a touch operation and a press-down operation performed by the user for the sensing area, a generation unit (e.g., a signal-generation unit 52 shown in FIG. 5) configured to generate the command signal corresponding to a result of the sensing performed by the sensing unit, and a transmission unit (e.g., a transmission unit 53 shown in FIG. 5) configured to transmit the command signal generated by the generation unit.

In addition to the components of the above-described remote controller, a remote controller according to another embodiment of the present invention further includes a plurality of detection units (e.g., four-direction buttons 32 shown in FIG. 4) that is provided in an area surrounding the sensing unit in at least four directions including an upper direction, a lower direction, a left direction, and a right direction, and that is configured to detect the press-down operation performed by the user. Further, the generation unit generates the command signal corresponding to a result of the detection performed by the detection units.

A sensing unit according to another embodiment of the present invention includes a position-determination unit (e.g., an operation-position-sensing unit 61 shown in FIG. 6) configured to determine for which of the sensing areas the user performs the touch operation and a press-down-detection unit (e.g., a press-down-sensing unit 62 shown in FIG. 6) which detects for which of the sensing areas the user performs the press-down operation.

A remote-control method according to another embodiment of the present invention includes the steps of sensing at least one of a touch operation and a press-down operation performed by a user for a plurality of the sensing areas corresponding to a plurality of areas provided on a screen showing an image of the video signal transmitted from an information-processing device (e.g., step S2 shown in FIG. 8), generating the command signal corresponding to a result of the sensing performed at the sensing step (e.g., step S7 shown in FIG. 8), and transmitting the command signal generated at the generation step (e.g., step S4 shown in FIG. 8).

An information-processing device according to another embodiment of the present invention (e.g., the information-processing device 22 shown in FIG. 3) has a reception unit (e.g., a reception unit 82 shown in FIG. 7) which receives a command signal transmitted from a remote controller including a sensing unit that includes a plurality of the sensing areas corresponding to a plurality of areas provided on a screen on a one-to-one basis and that detects at least one of a touch operation and a press-down operation performed by the user for the sensing area, a plurality of detection units that is provided in an area around the sensing unit in at least four directions including an upper direction, a lower direction, a left direction, and a right direction and that is configured to detect the press-down operation performed by the user, a generation unit configured to generate the command signal corresponding to the sensing result obtained by the sensing unit and/or the detection result obtained by the detection units, and a transmission unit which transmits the command signal generated by the generation unit. The information-processing device further has a processing unit (e.g., a CPU 71 shown in FIG. 7) which performs the processing corresponding to the command signal received by the reception unit. According to the command signal corresponding to the sensing result obtained by the sensing unit, the processing unit moves a marking indicating which of the plurality of areas shown on the screen is selected or performs processing assigned to at least one of the areas provided on the screen, the area being selected. Subsequently, information shown on the screen is changed according to the command signal corresponding to the detection result obtained by the detection unit.

Figure 9:
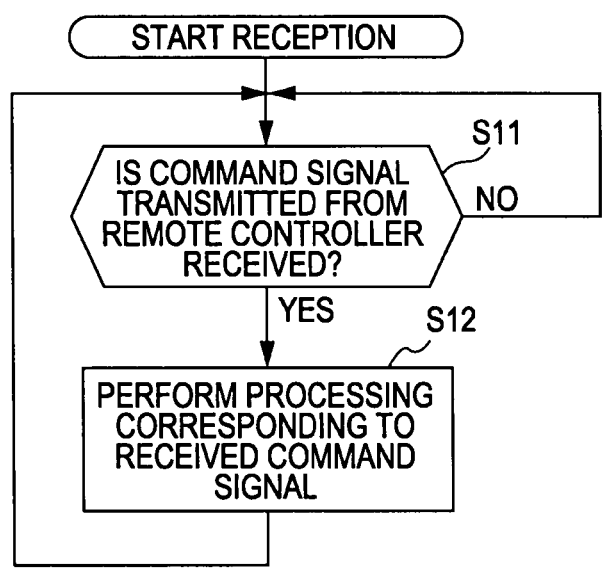
FIG. 9 is a flowchart illustrating reception processing performed by the information-processing device shown in FIG. 7.

An information-processing method according to another embodiment of the present invention includes the step of receiving a command signal transmitted from a remote controller having a sensing unit that includes a plurality of the sensing areas corresponding to a plurality of areas provided on a screen on a one-to-one basis and that detects at least one of a touch operation and a press-down operation performed by the user for the sensing area, a plurality of detection units that is provided in an area around the sensing unit in at least four directions including an upper direction, a lower direction, a left direction, and a right direction and that is configured to detect the press-down operation performed by the user, a generation unit configured to generate the command signal corresponding to the sensing result obtained by the sensing unit and/or the detection result obtained by the detection units, and a transmission unit which transmits the command signal generated by the generation unit (e.g., step S11 shown in FIG. 9). The information-processing method further has the step of performing the processing corresponding to the command signal received at the reception step (e.g., step S12 of FIG. 9). At the processing step, either processing for moving a marking indicating which of the plurality areas shown on the screen is selected, or processing assigned to at least one of the areas provided on the screen, the area being selected, is performed according to the command signal corresponding to the sensing result obtained at the sensing step. Subsequently, information shown on the screen is changed according to the command signal corresponding to the detection result obtained at the detection step.

Since the correspondence between the components disclosed in an attached claim of a program of the present invention and those disclosed in embodiments of the present invention is the same as that between the components disclosed in attached claims of the above-described information-processing method and those disclosed in the embodiments of the present invention, the description thereof is omitted.

Hereinafter, embodiments of the present invention will be described in detail with reference to the attached drawings.

FIG. 3 shows an example configuration of a remote-control system 20 according to an embodiment of the present invention. The remote-control system 20 includes a remote controller 21, an information-processing device 22, and a display 23. The remote controller 21 detects an operation performed by a user and transmits the command signal corresponding to the detected operation. Upon receiving the command signal, the information-processing device 22 performs the processing corresponding to the command signal and transmits an image signal to the display 23, as the processing result. The display 23 produces the image corresponding to the image signal transmitted from the information-processing device 22.

FIG. 4 shows an example external configuration of the remote controller 21 according to another embodiment of the present invention. The remote controller 21 includes an operation pad 31 operated by the user, so as to move a cursor (or a highlighted area) shown on a screen produced on the display 23 and/or accept selection made by using the cursor, and an upper-direction button 32-1, a lower-direction button 32-2, a left-direction button 32-3, and a right-direction button 32-4 that are pressed down by the user, so as to change information shown on the screen.

If there is no need to differentiate between the above-described buttons 32-1 to 32-4, the buttons are simply referred to as four-direction buttons 32.

The top-face area of the operation pad 31 is divided into a predetermined number (49=7×7 in the case of FIG. 4) of areas and configured to sense the touch operation performed by the user for each of the areas and the press-down operation performed by the user for any of the areas. Further, depressions and/or projections are provided on the top face of the operation pad 31 by performing embossment or the like so that the user can recognize borders between the divided areas with his finger. Each of the areas corresponds to a predetermined position on the screen of the display 23, so that the user can specify a position on the screen without delay by touching and/or pressing down any of the divided areas.

Further, the remote controller 21 includes a plurality of operation buttons 33 which is pressed down by the user, so as to turn on and/or off the power of the information-processing device 22, or transmit instructions to perform processing of various types.

FIG. 5 shows an example internal configuration of the remote controller 21. The operation pad 31, the four-direction buttons 32, and the operation buttons 33 sense the operation performed by the user and transmits the sensing signal corresponding to the operation performed by the user to an operation-determination unit 51. On the basis of the sensing signal transmitted from the operation pad 31, the four-direction buttons 32, and the operation buttons 33, the operation-determination unit 51 determines which of the operation pad 31, the four-direction buttons 32, and the operation buttons 33 was operated and transmits information about a result of the determination to a signal-generation unit 52. On the basis of the determination-result information transmitted from the operation-determination unit 51, the signal-generation unit 52 generates the command signal corresponding to the operation performed by the user and transmits the command signal to a transmission unit 53. The transmission unit 53 transmits the command signal transmitted from the signal-generation unit 52 via wireless communications using infrared rays and/or electromagnetic waves, for example.

FIG. 6 shows an example configuration of the operation pad 31. An operation-position-sensing unit 61 senses which of the areas of the operation pad 31 is touched by the user and transmits information about the sensing result to an OR-calculation unit 63. A press-down-sensing unit 62 senses which of the areas of the operation pad 31 is pressed down by the user and transmits information about the sensing result to the OR-calculation unit 63. Upon receiving the sensing-result information transmitted from the operation-position-sensing unit 61 and/or the press-down-sensing unit 62, the OR-calculation unit 63 generates a sensing signal indicating the touch position and/or a sensing signal indicating the press-down position and transmits the generated sensing signal to the operation-determination unit 51 following the operation pad 31. Further, while the touch operation and/or the press-down operation is kept being performed by the user, the OR-calculation unit 63 may generate and transmit a sensing signal indicating the touch position and the state of being touched, and/or a sensing signal indicating the press-down position and the state of being pressed down.

As has been described, the press-down-sensing unit 62 only senses any of the areas of the operation pad 31 was pressed down by the user. That is to say, the press-down-sensing unit 62 does not sense which of the areas was pressed down. However, the operation-position-sensing unit 61 determines the position of the area touched by the user. Subsequently, it becomes possible to determine the position of the area pressed down by the user.

Thus, the press-down-sensing unit 62 only senses that the user presses down any of the areas of the operation pad 31. Subsequently, in comparison with the case where the press-down-sensing unit 62 can sense which of the areas is pressed down on an individual basis, it becomes possible to reduce the number of items and the manufacturing cost. Further, if the press-down-determination unit 62 can sense which of the areas is pressed down by the user, the press-down operation has to be watched by scanning each of the areas, which means that electrical power is consumed at all times. On the contrary, the press-down-sensing unit 62 consumes electrical power only when the press-down operation is performed. Subsequently, the amount of electrical consumption is reduced.

Next, FIG. 7 shows an example configuration of the information-processing device 22 including a central-processing unit (CPU) 71. An input-and-output interface 75 is connected to the CPU 71 via a bus 74. A read-only memory (RAM) 72 and a random-access memory (RAM) 73 are connected to the bus 74.

The input-and-output interface 75 includes an input unit 76 through which the user transmits an operation command, where the input unit includes a button or the like provided on the top face of a cabinet. The input-and-output interface 75 further includes an output unit 77 used for transmitting an image signal to the display 23, a storage unit 78 including a hard-disk drive or the like storing programs and/or various data, a modem, a local-area-network (LAN) adapter, and so forth. Further, a communication unit 79 which performs communications via a network such as the Internet is connected to the input-and-output interface 75. Still further, a drive 80 is connected to the input-and-output interface 75, where the drive 80 reads and/or writes data from and/or onto a recording medium 81, such as a magnetic disk including a flexible disk, an optical disk including a compact disc-read only memory (CD-ROM), and a digital versatile disk (DVD), a magneto-optical disc including a mini disc (MD), a semiconductor memory, and so forth. Still further, a reception unit 82 is connected to the input-and-output interface 75, where the reception unit 82 receives the command signal transmitted from the remote controller 21 via wireless communications using infrared rays, electromagnetic waves, and so forth.

The CPU 71 loads a predetermined program installed on a storage unit 78 on a RAM 73 and executes the program, thereby performing the processing corresponding to a command signal transmitted from the reception unit 82 via the input-and-output interface 75 and the bus 74. Then, the CPU 71 makes the output unit 77 transmit an image signal to the display 23, as the processing result.

Next, transmission processing performed by the remote controller 21 will be described with reference to a flowchart of FIG. 8. At step S1, the operation-determination unit 51 waits until a sensing signal is transmitted from the operation pad 31, the four-detection buttons 32, and the operation buttons 33. If it is determined that the sensing signal is transmitted, the processing advances to step S2, so as to determine whether or not the transmitted sensing signal corresponds to an operation (touch or depression) performed for the operation pad 31.

If it is determined that the transmitted sensing signal does not correspond to the operation performed for the operation-pad 31, at step S2, the processing advances to step S3, whereat the operation-determination unit 51 transmits information about a result of the determination to the signal-generation unit 52, where the determination-result information indicates the button pressed by the user (any one of the four-direction buttons 32 or the operation buttons 33. The signal-generation unit 52 generates the command signal corresponding to the button pressed down by the user and transmits the command signal to the transmission unit 53 on the basis of the determination-result information transmitted from the operation-determination unit 51.

At step S4, the transmission unit 53 transmits the command signal transmitted from the signal-generation unit 52 via the wireless communications using infrared rays, electromagnetic waves, and so forth. Upon receiving the command signal, the information-processing device 22 performs predetermined processing, which will be described later in detail.

If it is determined that the transmitted sensing signal corresponds to the operation performed for the operation pad 31, at step S2, the processing advances to step S5 whereat the operation-determination unit 51 specifies the position where the user performs the touch operation and/or the press-down operation on the operation pad 31 on the basis of the sensing signal transmitted from the operation pad 31. At step S6, the operation-determination unit 51 determines whether or not the operation pad 31 is pressed down on the basis of the sensing signal transmitted from the operation pad 31.

If it is determined that the operation pad 31 is pressed down, at step S6, the processing advances to step S7 whereat the operation-determination unit 51 transmits information about the determination result to the signal-generation unit 52, where the determination result includes information indicating that the press-down operation is performed on the operation pad 31 and information indicating the position where the press-down operation is performed. The signal-generation unit 52 generates a command signal indicating that the operation pad 31 is pressed down and the pressed-down position on the basis of the determination-result information transmitted from the operation-determination unit 51 and transmits the command signal to the transmission unit 53. Then, the processing advances to step S4 so that the transmission unit 53 transmits the generated command signal via wireless communications.

On the other hand, if it is determined that the operation pad 31 is not pressed down, that is to say, the operation pad 31 is touched, at step S6, the processing advances to step S8 whereat the operation-determination unit 51 transmits information about the determination result to the signal-generation unit 52, where the determination result includes information indicating that the touch operation is performed on the operation pad 31 and information indicating the position where the touch operation is performed. The signal-generation unit 52 generates a command signal indicating that the operation pad 31 is touched and the touch-operation position on the basis of the determination-result information transmitted from the operation-determination unit 51 and transmits the command signal to the transmission unit 53. Then, the processing advances to step S4 so that the transmission unit 53 transmits the generated command signal via wireless communications, whereby the transmission processing performed by the remote controller 21 is terminated.

FIG. 9 is a flowchart illustrating reception processing performed by the information-processing device 22, so as to receive the command signal transmitted from the remote controller 21. The reception processing is performed when the CPU 71 has started a predetermined program loaded on the RAM 73 and the reception unit 82 is ready to receive the command signal transmitted from the remote controller 21.

At step S11, the reception unit 82 waits until the command signal is transmitted from the remote controller 21. Upon receiving the command signal transmitted from the remote controller 21, the processing advances to step S12 whereat the reception unit 82 transmits the command signal transmitted thereto at step S11 to the CPU 71 via the input-and-output interface 75 and the bus 74. The CPU 71 performs the processing corresponding to the transmitted command signal, which will be described with reference to FIG. 10 or later. Then, the processing returns to step S11 for the next command signal transmitted from the remote controller 21, so that the same processing is performed again. Thus, the information-processing device 22 performs the reception processing.

FIGS. 10 to 19 show example operations performed by the information-processing device 22, where the operations correspond to the operations performed for the operation pad 31 and/or the four-direction buttons 32 of the remote controller 21.

Figure 10:
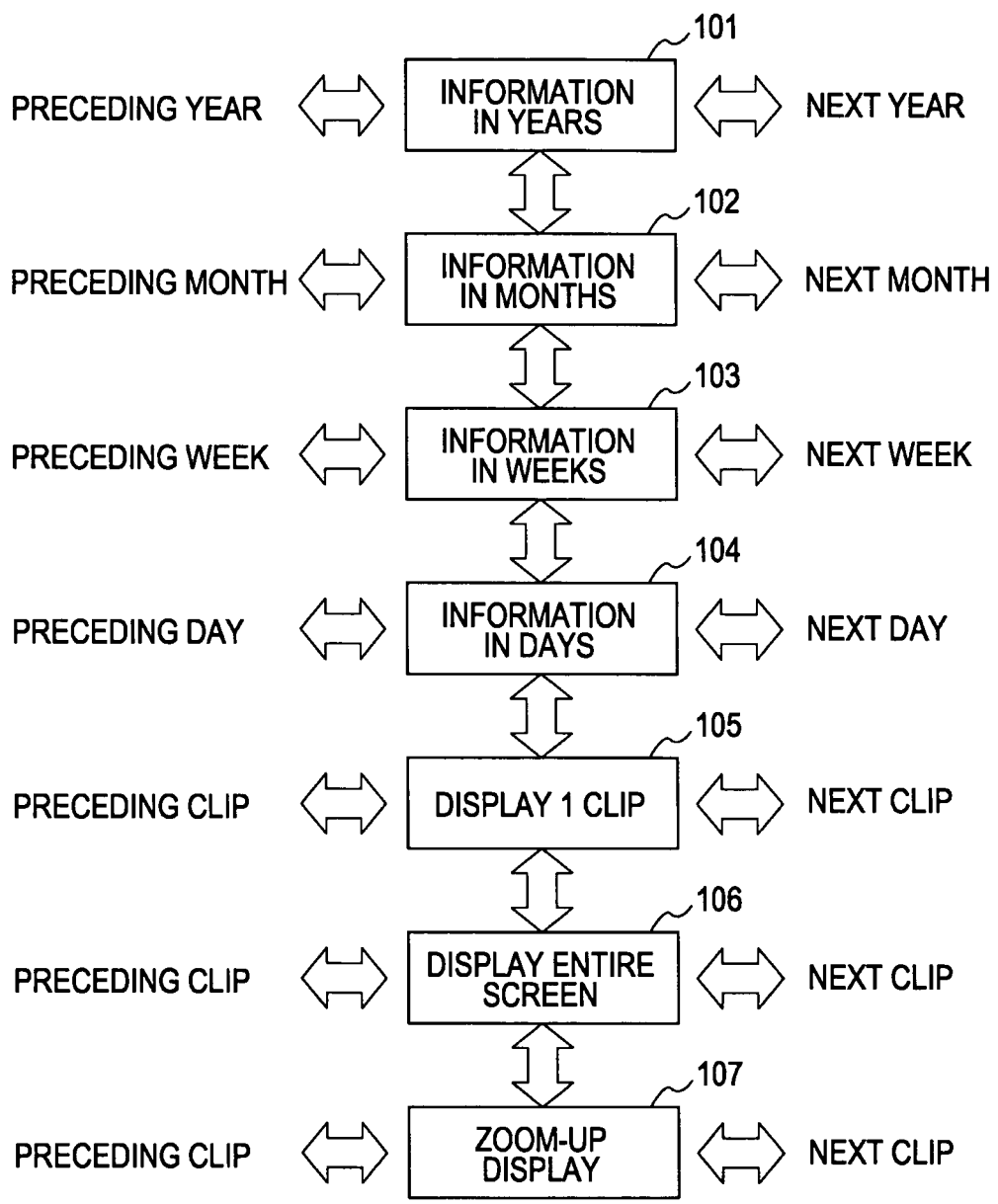
FIG. 10 illustrates the functions of four-direction buttons provided on the remote controller.

FIG. 10 shows changes in a display image produced on the display 23, as a result of processing performed by the information-processing device 22, where the processing corresponds to the press-down operation performed for the four-direction buttons 32. The display 23 switches among hierarchical display images showing information-in-years 101, information-in-months 102, information-in-weeks 103, information-in-days 104, single-clip display 105, entire-screen display 106, and zoom-up display 107, for example. Here, the term "single clip" denotes a single data item, such as data on a single image.

When the upper-direction button 32-1 of the four-direction buttons 32 is pressed down, the display image produced by the display 23 is changed to a display image showing information higher than the previous information by as much as a single level. For example, when the information-in-days 104 is shown, the display image is changed to a display image showing the information-in-weeks 103. Further, when the information-in-weeks 103 is shown, the display image is changed to a display image showing the information-in-months 102, and when the information-in-months 102 is shown, the display image is changed to a display image showing the information-in-years 101. When the lower-direction button 32-2 is pressed down, the display image produced by the display 23 is changed to a display image showing information lower than the previous information by as much as a single level. For example, when the information-in-years 101 is shown, the display image is changed to the display image showing the information-in-months 102. Further, when the information-in-months 102 is shown, the display image is changed to the display image showing the information-in-weeks 103, and when the information-in-weeks 103 is shown, the display image is changed to the display image showing the information-in-days 104.

When the left-direction button 32-3 is pressed down, the display image produced on the display 23 is changed to a display image showing the next previous information on the same level as that of the currently shown information. For example, when the information-in-years 101 of 2005 is shown, the display image is changed to a display image showing the information-in-years 101 of 2004. Further, when the information-in-months 102 of March is shown, the display image is changed to a display image showing the information-in-months 102 of February. When the right-direction button 32-4 is pressed down, the display image produced on the display 23 is changed to a display image showing the next information on the same level as that of the currently shown information. For example, when the information-in-years 101 of 2005 is shown, the display image is changed to a display image showing the information-in-years 101 of 2006. Further, when the information-in-months 102 of March is shown, the display image is changed to a display image showing the information-in-months 102 of April.

Figure 11:
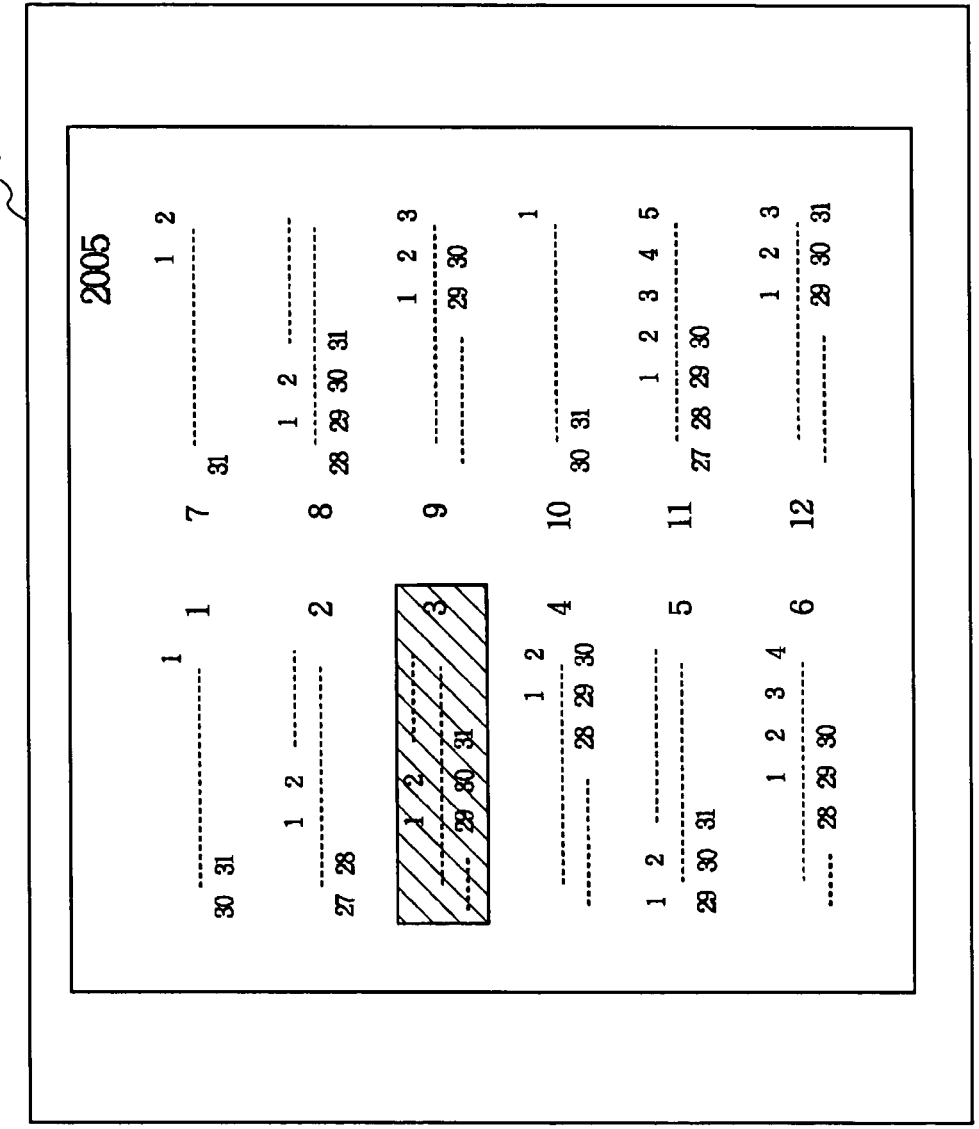
FIG. 11 shows an example display image of information in years, the image being produced on a display.

FIG. 11 shows an example display image produced on the display 23, where the display image shows the information-in-years 101 of 2005. When the left-direction button 32-3 is pressed down while the display 23 produces the display image shown in FIG. 11, the display image is changed to the display image showing the information-in-years 101 of 2004. Further, when the right-direction button 32-4 is pressed down, the display image produced on the display 23 is changed to the display image showing the information-in-years 101 of 2006.

In FIG. 11, the display image shows the information-in-years 101 and the part corresponding to March is selected and/or highlighted by a cursor. The position of the cursor (or the highlighted part) can be moved to a predetermined position immediately by touching the operation pad 31 of the remote controller 21 at the position corresponding to the predetermined position. For example, if the user touches the lower-left corner of the operation pad 31 while the display image shown in FIG. 11 is produced, the highlighted part can be moved instantly to the position corresponding to June. Further, if the user touches the lower-right corner of the operation pad 31 while the display image shown in FIG. 11 is produced, the display image produced on the display 23 can be changed to a display image showing the information-in-months 102 of December.

Further, if the user presses down the lower-direction button 32-2 while the display image shown in FIG. 11 is produced, the display image produced on the display 23 can be changed to the display image showing the information-in-months 102.

Figure 12:
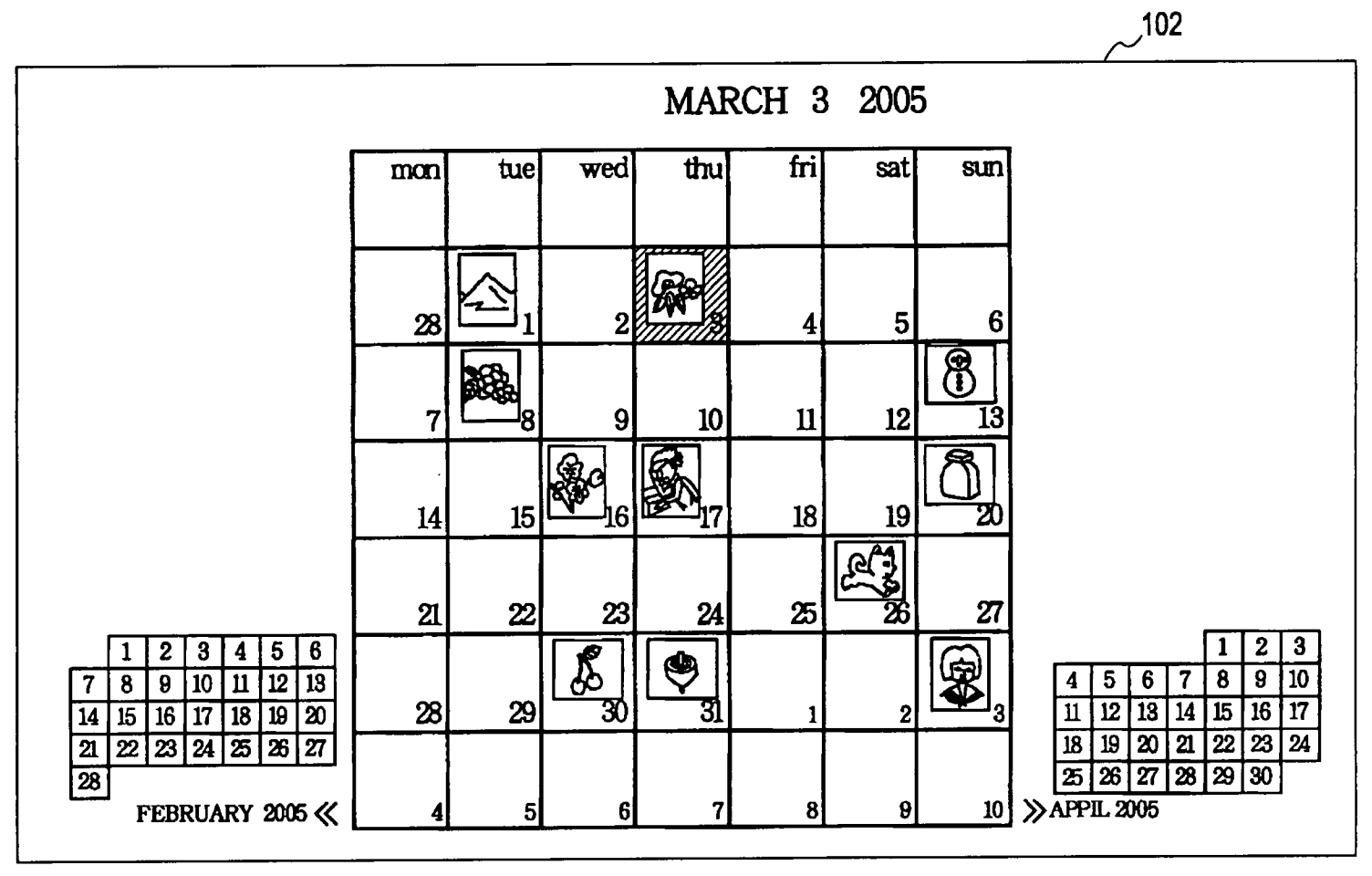

Since the part corresponding to March is selected in the case of FIG. 11, the display image can be changed to the display image showing the information-in-months 102 of March, as shown in FIG. 12.

As described above, FIG. 12 shows an example of the display image produced by the display 23. More specifically, the display image shows the information-in-months 102 of March, 2005. The user can establish correspondences between a single date and a plurality of predetermined data items such as image-data items stored in the storage unit 78 or the like. Therefore, the small image corresponding to one of the data items for which the correspondences are established is shown in each of rectangles showing the dates to which predetermined data items correspond. In the case of FIG. 12, the above-described dates may be March 1, 3, 8, 13, and so forth. Further, the above-described small image may be a thumbnail image obtained by downsizing image data for which correspondence is established, an icon indicating the extension of data for which correspondence is established, and so forth.

Further, if the user presses down the left-direction button 32-3 while the display image shown in FIG. 12 is produced, the display image produced on the display 23 can be changed to the display image showing the information-in-months 102 of February which is the next previous month with reference to March. Further, when the right-direction button 32-4 is pressed down, the display image produced on the display 23 is changed to the display image showing the information-in-months 102 of April which is the next month with reference to March.

As shown in the information-in-months 102 of FIG. 12, the part corresponding to 3rd is selected and/or highlighted by the cursor. The position of the cursor (or the highlighted part) can be moved to a predetermined part instantly by touching the operation pad 31 of the remote controller 21 at the position corresponding to the predetermined part. Further, for example, if the user touches the lower-right corner of the operation pad 31 while the display image shown in FIG. 12 is produced, the highlighted part can be moved instantly to the position corresponding to April 10. Further, if the user presses the lower-left corner of the operation pad 31 while the display image shown in FIG. 12 is produced, the display image produced on the display 23 can be changed to a display image showing the information-in-days 104 of April 4th.

Further, if the user presses the lower-direction button 32-2 while the display image shown in FIG. 12 is produced, the display image produced on the display 23 can be changed to the display image showing the information-in-weeks 103. Since the part corresponding to 3rd is selected in the case of FIG. 12, the display image can be changed to the display image showing the information-in-weeks 103 of the first week of March including March 3rd, as shown in FIG. 13.

Further, if the user presses down the upper-direction button 32-1 while the display image shown in FIG. 12 is produced, the display image produced on the display 23 can be changed to the display image showing the information-in-years 101.

Figure 13:
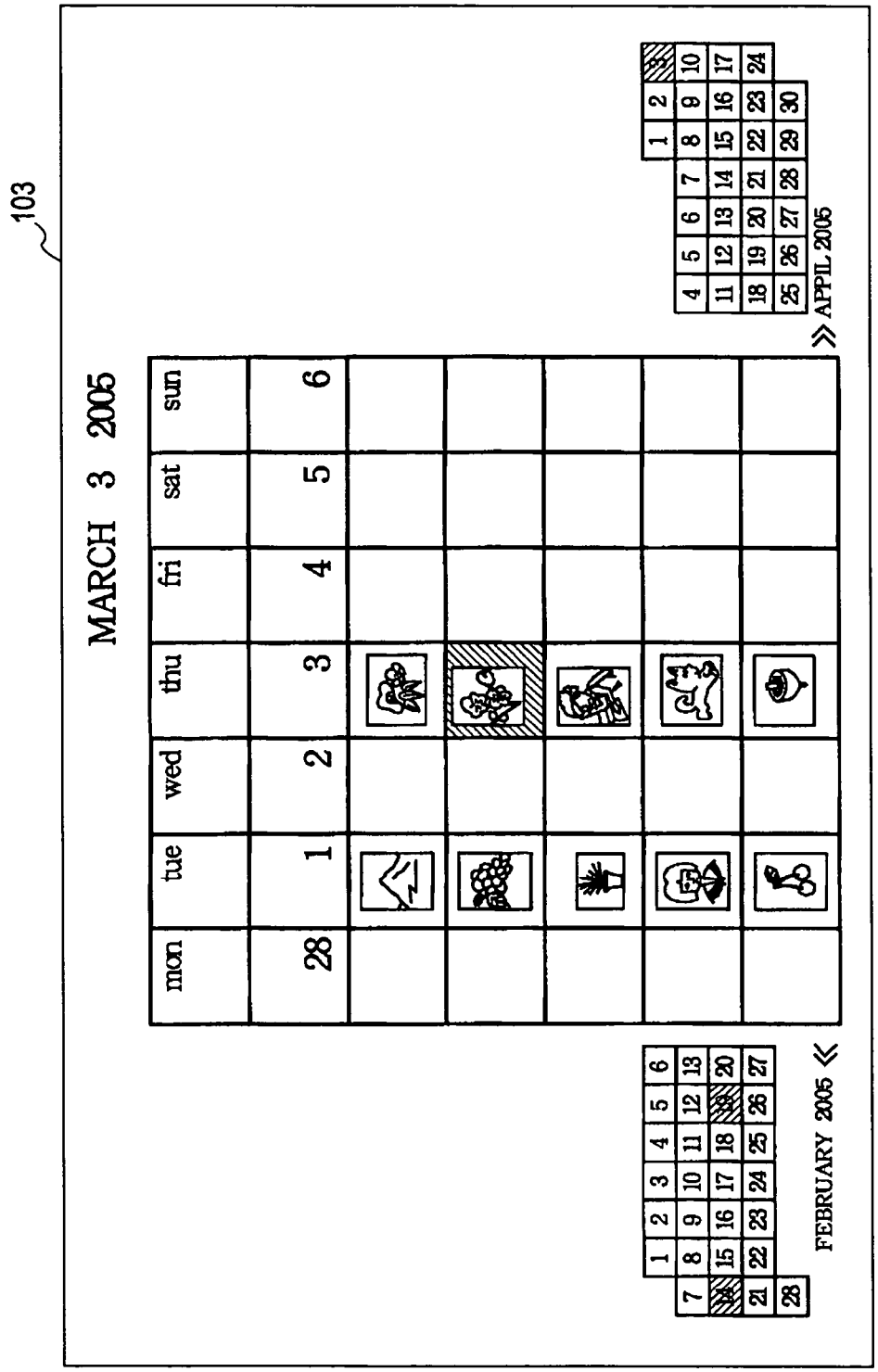
FIG. 13 shows an example display image of information in weeks, the image being produced on the display.

FIG. 13 shows an example of the display image produced by the display 23. More specifically, the display image shows the information-in-weeks 103 of the first week of March, 2005. According to the information-in-weeks 103, the small image corresponding to one of the data items for which the correspondences are established is shown in each of rectangles in a column showing the dates to which predetermined data items correspond. In the case of FIG. 13, the above-described dates may be March 1, 3, 8, 10, and so forth. Further, the above-described small image may be a thumbnail image obtained by downsizing image data for which correspondence is established, an icon indicating the extension of data for which correspondence is established, and so forth.

Further, if the user presses down the left-direction button 32-3 while the display image shown in FIG. 13 is produced, the display image produced on the display 23 is changed to the display image showing the information-in-weeks 103 of a week that is earlier than the first week of March and that includes a date to which predetermined data corresponds. Further, when the right-direction button 32-4 is pressed down, the display image produced on the display 23 is changed to the display image showing the information-in-weeks 103 that is later than the first week of March and that includes a date to which predetermined data corresponds.

As shown in the information-in-weeks 103 of FIG. 13, one of the small images of predetermined data items corresponding to 3rd is selected and/or highlighted by the cursor. The position of the cursor (or the highlighted part) can be moved to a predetermined part instantly by touching the operation pad 31 of the remote controller 21 at the position corresponding to the predetermined part. For example, if the user presses down the operation pad 31 at the position corresponding to a predetermined part, the display image produced on the display 23 can be changed to a display image showing the predetermined data corresponding to the small image corresponding to the pressed-down position. The small image may be the single-clip display 105 shown in FIG. 15.

Further, if the user presses down the lower-direction button 32-2 while the display image shown in FIG. 13 is produced, the display image produced on the display 23 can be changed to the display image showing the information-in-days 103. Since the part corresponding to 3rd is selected in the case of FIG. 13, the display image can be changed to the display image showing the information-in-days 104 of March 3rd, as shown in FIG. 14.

Further, if the user presses down the upper-direction button 32-1 while the display image shown in FIG. 13 is produced, the display image produced on the display 23 can be changed to the display image showing the information-in-months 102.

Figure 14:
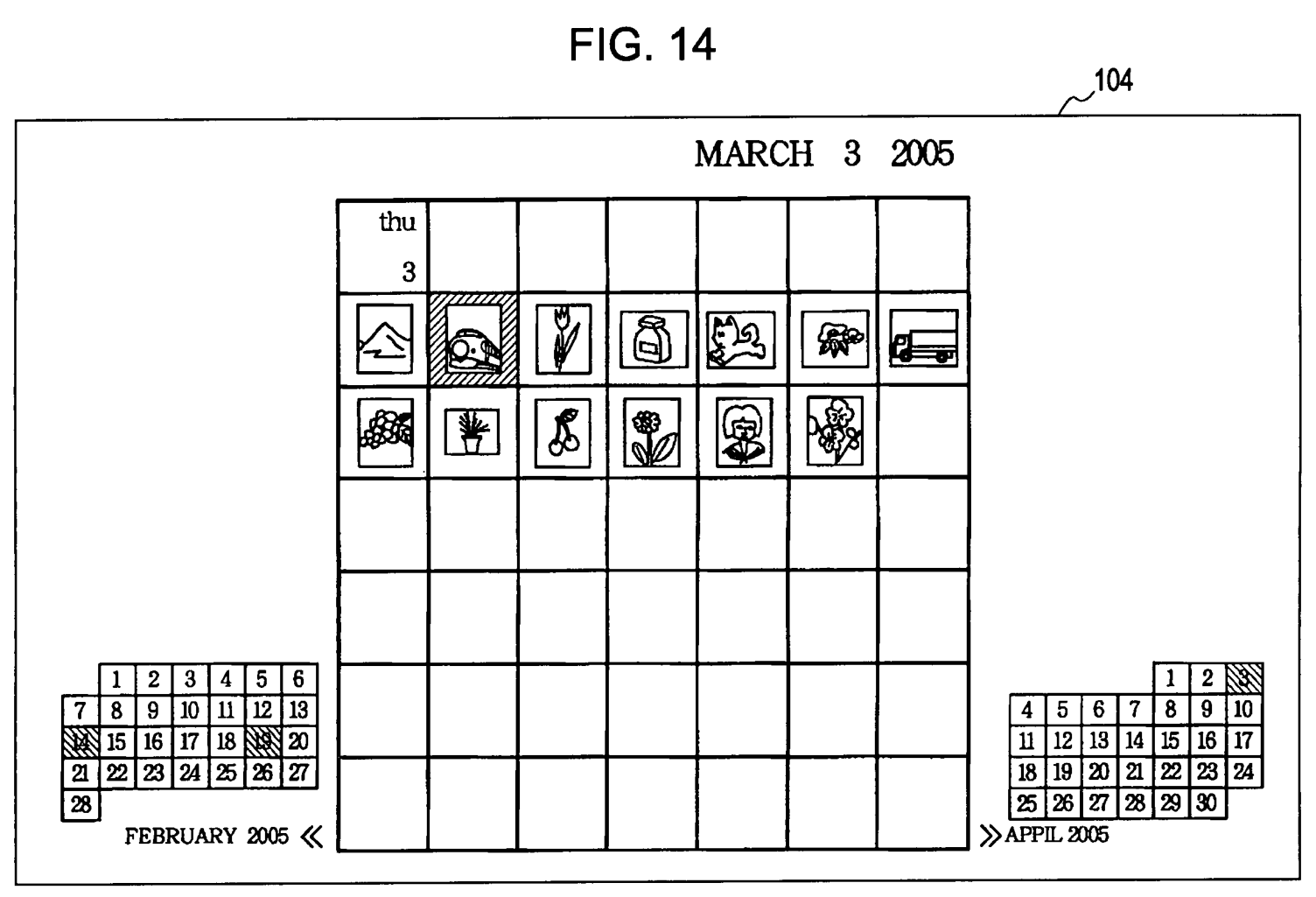

FIG. 14 shows an example of the display image produced by the display 23. More specifically, the display image shows the information-in-days 104 of Mar. 3rd, 2005. The display image of the information-in-days 104 shows the small images corresponding to the predetermined data items corresponding to 3rd.

Further, if the user presses down the left-direction button 32-3 while the display image shown in FIG. 14 is produced, the display image produced on the display 23 is changed to the display image showing the information-in-days 104 of a day that is earlier than March 3rd and that corresponds to predetermined data. Further, when the right-direction button 32-4 is pressed down, the display image produced on the display 23 is changed to the display image showing the information-in-days 104 of a day that is later than March 3rd and that corresponds to predetermined data.

As shown in the information-in-days 104 of FIG. 14, a small image which is the second image counted from the left of an uppermost row is selected and/or highlighted by the cursor. The position of the cursor (or the highlighted part) can be moved to a predetermined part instantly by touching the operation pad 31 of the remote controller 21 at the position corresponding to the predetermined part. Further, for example, if the user presses down the operation pad 31 at the position corresponding to a predetermined part of the display image produced on the display 23, the display image produced on the display 23 can be changed to a display image showing the predetermined data corresponding to the small image corresponding to the pressed-down part, such as the image of the single-clip display 105, as shown in FIG. 15.

Further, if the user presses down the lower-direction button 32-2 while the display image shown in FIG. 14 is produced, the display image produced on the display 23 can be changed to the single-clip display 105. Since the second image counted from the left of the uppermost row is selected in the case of FIG. 14, the display image can be changed to the display image of the single-clip display 105 showing the image data corresponding to the selected small image, as shown in FIG. 15.

Further, if the user presses down the upper-direction button 32-1 while the display image shown in FIG. 14 is produced, the display image produced on the display 23 can be changed to the display image of the information-in-weeks 103.

Figure 15:
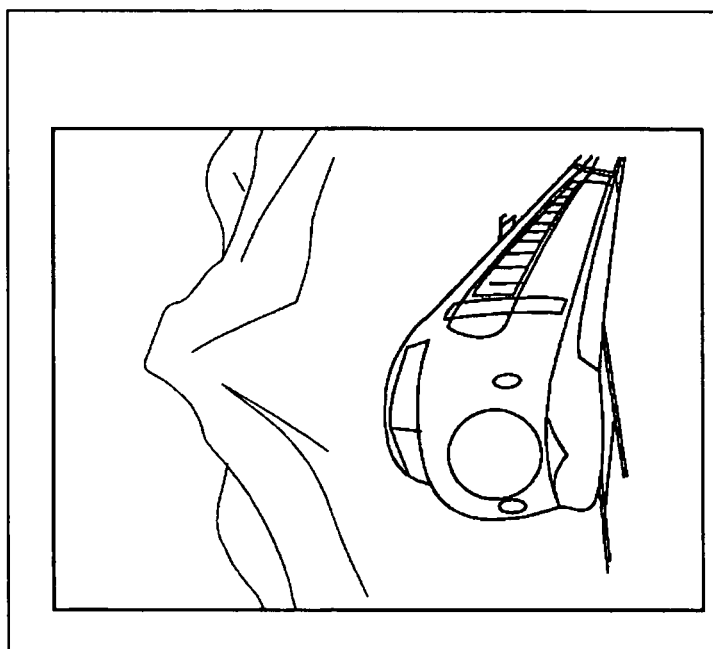
FIG. 15 shows an example display image of single-clip display, the image being produced on the display.

FIG. 15 shows an example display image of the single-clip display 105 produced on the display 23. More specifically, the single-clip display 105 shows an image of the image data corresponding to March 3rd.

Further, if the user presses down the left-direction button 32-3 while the display image shown in FIG. 15 is produced, the display image produced on the display 23 is changed to the single-clip display 105 showing an image of the image data or the like that corresponds to March 3rd and that is the previous image data with reference to the currently shown image data. Further, if the user presses down the right-direction button 32-4 while the display image shown in FIG. 15 is produced, the display image produced on the display 23 is changed to the single-clip display 105 showing an image of the image data or the like that corresponds to March 3rd and that is the next image data with reference to the currently shown image data.

Figure 16:
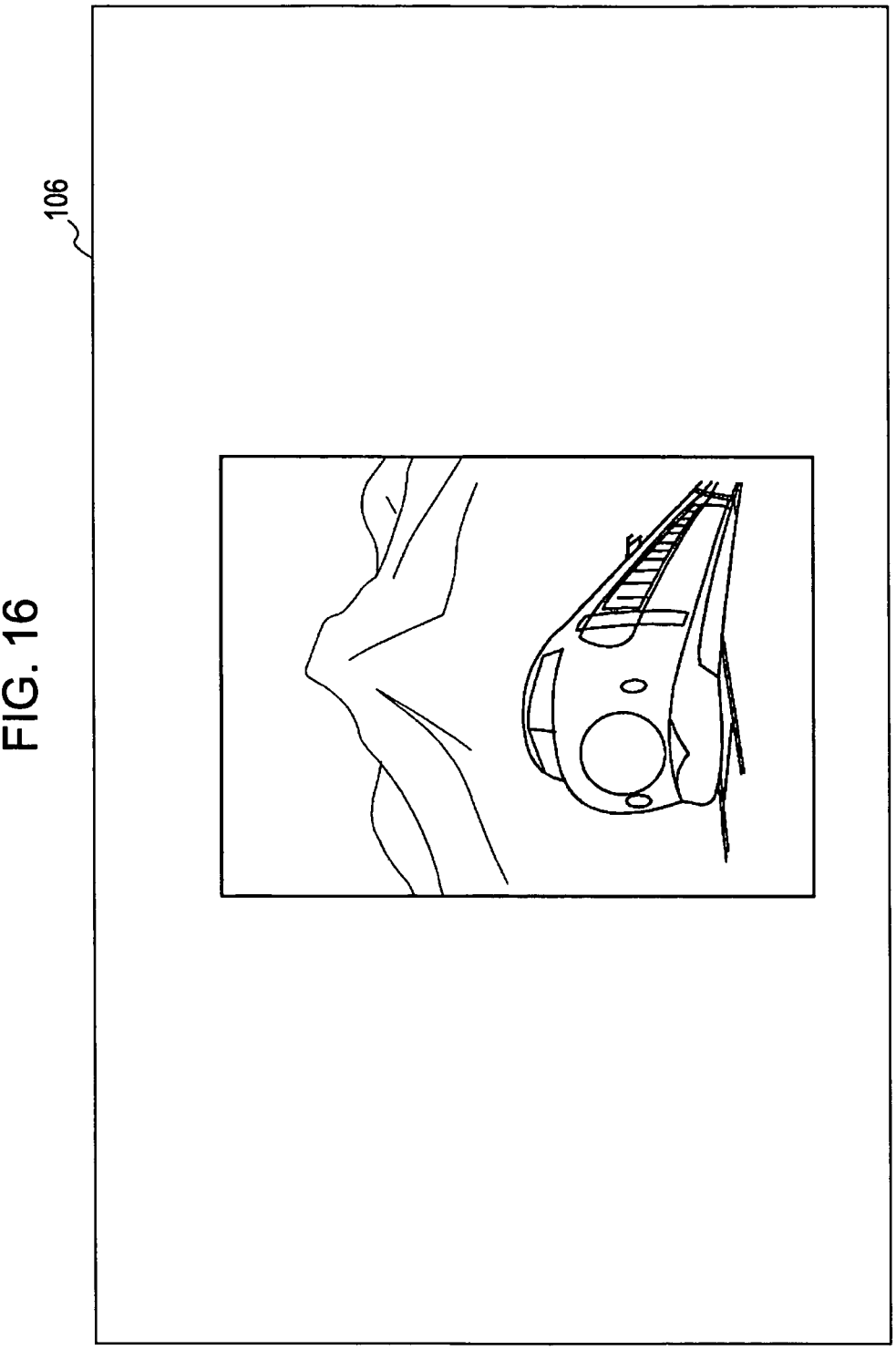
FIG. 16 shows an example display image of entire-screen display, the image being produced on the display.

If the user presses down the lower-direction button 32-2 while the display image shown in FIG. 15 is produced, the display image produced on the display 23 can be changed to an image of the entire-screen display 106, so as to fill a display frame with the currently shown image, as shown in FIG. 16.

Further, if the user presses down the upper-direction button 32-1 while the display image shown in FIG. 15 is produced, the display image produced on the display 23 can be changed to the display image showing the information-in-days 104.

FIG. 16 shows an example image of the entire-screen display 106 produced on the display 23. The entire-screen display 106 shows an image of the same image data as that of FIG. 15.

Further, if the user presses down the left-direction button 32-3 while the display image shown in FIG. 16 is produced, the display image produced on the display 23 is changed to that of the entire-screen display 106 showing the image data or the like that corresponds to March 3rd and that is the previous image data with reference to the currently shown image data. Further, if the user presses down the right-direction button 32-4, the display image produced on the display 23 is changed to that of the entire-screen display 106 showing the image data or the like that corresponds to March 3rd and that is the next image data with reference to the currently shown image data.

Figure 17:
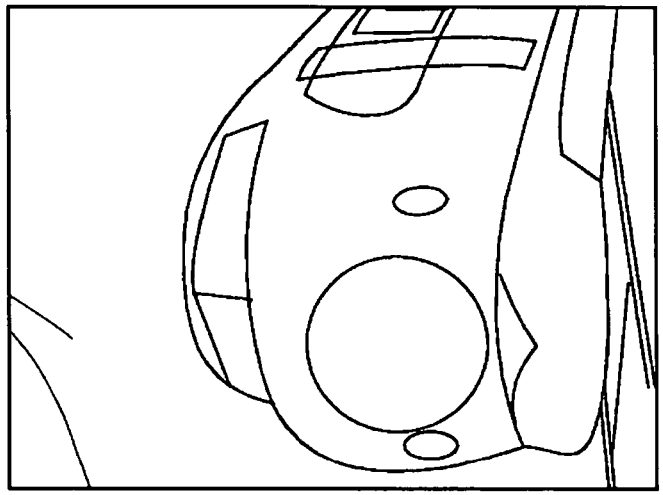
FIG. 17 shows an example display image of zoom-up display, the image being produced on the display.

If the user presses down the lower-direction button 32-2 while the display image shown in FIG. 16 is produced, the display image produced on the display 23 is changed to that of the zoom-up display 107 showing an image obtained by zooming up on a predetermined part of the currently shown display image (a part selected by the user's touch on the operation pad 31), as shown in FIG. 17. Further, if the user presses down the operation pad 31 while the display image shown in FIG. 16 is produced, the display image produced on the display 23 is changed to that of the zoom-up display 107 showing the part corresponding to the pressed-down position on the display image.

If the user presses down the upper-direction button 32-1 while the display image shown in FIG. 16 is produced, the display image produced on the display 23 can be changed to that of the single-clip display 105.

FIG. 17 shows an example image of the zoom-up display 107 produced on the display 23. The zoom-up display 107 shows an image of the same image data as that of FIGS. 15 and 16.

The zoom-up part on the display image can be moved by operating the operation pad 31 while the display image shown in FIG. 17 is produced.

If the user presses down the upper-direction button 32-1 while the display image shown in FIG. 16 is produced, the display image produced on the display 23 can be changed to that of the entire-screen display 106.

FIG. 18 shows an example image of a software keyboard 111 used for inputting Hiragana characters. The software keyboard 111 is an example software keyboard that can be operated by using the operation pad 31 of the remote controller 21. The software keyboard 111 is divided into forty-nine areas, as is the case with the operation pad 31. However, part of the software keyboard 111 includes a plurality of areas coupled to one another, such as an input-text display column 112.

The software keyboard 111 includes character keys "a", "i", "u", and so forth, the input-text display column 112, a cursor (or a highlighted part) 113, a left-direction key 114, and a right-direction key 115.

The input-text display column 112 shows a string of characters inputted by the user. The cursor (or the highlighted part) 113 indicates a character key or the like selected by the user by using the operation pad 31. When the user touches a predetermined part on the operation pad 31, the cursor 113 is immediately moved to a character key or the like on the software keyboard 111, the character key corresponding to the predetermined part on the operation pad 31. Further, when the operation pad 31 is pressed down, the selection made by the cursor 113 is accepted. For example, when a character button "o" is selected and pressed down by the user, the inputting of character "o" is accepted so that character "o" is added to the characters shown in the input-text display column 112.

If the left-direction key 114 or the right-direction key 115 is selected and the selection is accepted, a character selected by one of the character keys 114 shown on the software keyboard 111 is changed to another character. For example, when the right-direction key 115 is selected and the selection is accepted while the character keys 114 used for inputting characters of lines "a", "ka", "sa", "ta", and "na" are shown, as is the case with FIG. 18, the characters shown on the character keys 114 of the software keyboard 111 are changed to characters of lines "ha", "ma", "ya", "ra", and "wa". Further, if the left-direction key 114 is selected and the selection is accepted while the character keys 114 used for inputting the characters of lines "ha", "ma", "ya", "ra", and "wa" are shown, the characters shown on the character keys 114 of the software keyboard 111 are changed to characters of lines "a", "ka", "sa", "ta", and "na".

The above-described operations can be performed by pressing down the left-direction key 32-3 and/or the right-direction key 32-4 of the remote controller 21 in place of selecting the left-direction key 114 and/or the right-direction key 115 and accepting the selection by operating the operation pad 31 of the remote controller 21.

FIG. 19 shows an example image of a software keyboard 121 used for inputting alphabetic characters. The software keyboard 121 is an example software keyboard that can be operated by using the operation pad 31. The software keyboard 121 is divided into forty-nine areas, as is the case with the operation pad 31. However, part of the software keyboard 121 includes a plurality of areas coupled to one another, such as an input-text display column 122.

The software keyboard 121 includes character keys "A", "B", "C", and so forth, the input-text display column 122, and a cursor (or a highlighted part) 123.

The input-text display column 122 shows a string of characters inputted by the user. The cursor (or the highlighted part) 123 indicates a character key or the like selected by the user by using the operation pad 31. When the user touches a predetermined part on the operation pad 31, the cursor 123 is immediately moved to a character key or the like on the software keyboard 121, the character key corresponding to the predetermined part on the operation pad 31. Further, when the operation pad 31 is pressed down, the selection made by the cursor 123 is accepted. For example, when a character key "A" is selected and pressed down by the user, the inputting of character "A" is accepted so that character "A" is added to the characters shown in the input-text display column 122.

As has been described, the operation pad 31 and the four-direction buttons 32 are provided on the remote controller 21 according to embodiments of the present invention. Subsequently, the user can specify a predetermined position on the screen without delay. Further, the user can change information shown on the screen to information on a level higher or lower than that of the shown information, or information at the same level as that of the shown information according to the hierarchical information structure without conscious effort.

Further, the above-described series of processing procedures performed by the information-processing device can be performed by using not only hardware but also software.

Further, in this specification, steps for executing the above-described series of processing procedures are not necessarily performed in time sequence according to the written order. That is to say, the steps can be performed in parallel and/or separately.

It should be noted that the term "system" used in this specification denotes a set of a plurality of devices and/or apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. A remote-control system, comprising:
  a remote controller for controlling an information-processing device, the remote controller transmitting a command signal which corresponds to an operation performed by a user;
  the information-processing device configured to receive the command signal and perform processing in response to the command signal; and
  a display configured to display, to the user, at least one element of content associated with a video signal transmitted from the information-processing device,
  wherein the remote controller includes:
    sensing means for sensing an operation performed by the user in at least one of a plurality of coplanar sensing areas corresponding to selectable areas provided within the display, the sensing areas being separated from adjacent ones of the sensing areas by a depression;
    generation means for generating the command signal in accordance with a result of the sensing means; and
    transmission means for transmitting the command signal;
  wherein the information-processing device includes:
    reception means for receiving the command signal;
    determining means for determining, based on at least the received command signal, a spatial position and an operation type associated with the user operation, the operation type comprising at least one of a touch operation or a press-down operation; and
    processing means for performing processing in accordance with the determined spatial position and operation type, wherein:
      the processing means is further configured to generate a second signal to display at least one additional element of content;
      the additional and displayed content elements are ordered in accordance with a corresponding content sequence; and
      the additional content element is disposed in a position within the content sequence that is subsequent or precedent to the displayed content element;
    and
  wherein:
    the information-processing device is further configured to receive an additional command signal from the remote controller, the additional command signal corresponding to an additional operation performed by the user;
    the determining means is further configured to determine a spatial position associated with the additional user operation; and
    the processing means is further configured to generate an instruction to modify a visual characteristic associated with a portion of the displayed additional content element, the portion corresponding to the spatial position associated with the additional user operation.

2. A method for controlling an information-processing device, comprising:
  sensing an operation performed by the user in at least one of a plurality of coplanar sensing areas corresponding to selectable areas provided within a display unit, the sensing areas being separated from adjacent ones of the sensing areas by a depression;
  generating a command signal in accordance with a result of the sensing; and
  transmitting the command signal to the information-processing device, the information processing device being configured to:
    receive the command signal;
    determine, based on at least the received command signal, a spatial position and an operation type associated with the operation, the operation type comprising at least one of a touch operation or a press-down operation; and
    perform processing in accordance with the determined spatial position and operation type, wherein the information processing device is further configured to:
      identify at least one element of content displayed to a user; and
      generate a second signal to display at least one additional element of content to the user, wherein:

the additional and displayed content elements are ordered in accordance with a corresponding content sequence; and the additional content element is disposed in a position within the content sequence that is subsequent or precedent to the displayed content element;

wherein the method further comprises transmitting an additional command signal to the information-processing device, the additional command signal corresponding to an additional operation performed by the user in at least one of the coplanar sensing areas, and the information processing apparatus being further configured to:

determine, based on the command signal, a spatial position associated with the additional user operation; and generate, in response to the additional command signal, an instruction to modify a visual characteristic associated with a portion of the displayed additional content element, the portion corresponding to the spatial position associated with the additional user operation.

3. The remote-control method of claim 2, further comprising detecting the press-down operation performed by the user, the press-down operation corresponding to at least four directions including an upper direction, a lower direction, a left direction, and a right direction, and wherein the command signal is generated at the generation step in accordance with a result of the detection.

4. The remote-control method of claim 2, wherein the sensing step further includes:

determining the sensing area in which the user performs the touch operation, and detecting the sensing area in which the user performs the press-down operation.

5. A remote controller for controlling an information-processing device, comprising:

sensing means for sensing an operation performed by a user in at least one of a plurality of coplanar sensing areas corresponding to selectable areas provided on within a display unit, the sensing areas being separated from adjacent ones of the sensing areas by a depression;

generation means for generating a command signal in accordance with a result of the sensing means; and transmission means for transmitting the command signal to the information-processing device, the information processing device being configured to:

receive the command signal;

determine, based on at least the received command signal, a spatial position and an operation type associated with the operation, the operation type comprising at least one of a touch operation or a press-down operation; and perform processing in accordance with the determined spatial position and operation type, wherein the information processing device is further configured to:

identify at least one element of content displayed to the user; and generate a second signal to display at least one additional element of content to the user, wherein:

the additional and displayed content elements are ordered in accordance with a corresponding content sequence; and the additional content element is disposed in a position within the content sequence that is subsequent or precedent to the displayed content element; and wherein the transmission means transmits an additional command signal to the information-processing device, the additional command signal corresponding to an additional operation performed by the user in at least one of the coplanar sensing areas, and the information processing apparatus being further configured to:

determine, based on the command signal, a spatial position associated with the additional user operation; and generate, in response to the additional command signal, an instruction to modify a visual characteristic associated with a portion of the displayed additional content element, the portion corresponding to the spatial position associated with the additional user operation.

6. The remote controller according to claim 5, further comprising detection means provided in at least four directions including an upper direction, a lower direction, a left direction, and a right direction, for detecting the press-down operation performed by the user, and wherein the generation means generates the command signal in accordance with a result of the detection.

7. The remote controller according to claim 5, further comprising detection means provided in an area surrounding the sensing areas in at least four directions including an upper direction, a lower direction, a left direction, and a right direction, for detecting the press-down operation performed by the user, and wherein the generation means generates the command signal in accordance with a result of the detection.

8. The remote controller according to claim 5, wherein the sensing means further includes:

position-determination means for determining the sensing area in which the user performs the touch operation, and press-down-detection means for detecting the sensing area in which the user performs the press-down operation.

9. An information-processing device comprising:

reception means for receiving a command signal transmitted from a remote controller, the remote controller being configured to control an information-processing device;

determining means for determining whether the command signal corresponds to a first operation or a second operation, performed by a user of the remote control, wherein:

the first operation comprises at least one of a touch operation or a press-down operation applied to at least one of a plurality of coplanar separate sensing areas disposed on a surface of the remote control, the sensing areas being associated with corresponding selectable areas of a display unit; and the second operation comprises at least one of a touch operation or a press-down operation applied to a directional sensing unit disposed adjacent to at least one of the sensing areas on the remote control surface; and processing means for processing the received command signal, based on at least the determination, wherein the processing includes:

identifying at least one element of content displayed to the user;

generating, when the command signal corresponds to the first operation, a first signal to highlight at least a portion of the displayed content, the highlighted portion being disposed within the selectable area corresponding to the at least one sensing area associated with the first operation; and generating, when the command signal corresponds to the second operation, a second signal to display at least one additional element of content to the user, wherein:

the additional and displayed content elements are ordered in accordance with a corresponding content sequence; and the additional content element is disposed in a position within the content sequence that is subsequent or precedent to the displayed content element;

wherein:
the reception means is further configured to receive an additional command signal from the remote controller;
the determining means is further configured to determine whether the additional command signal corresponds to the first or second operation; and
when the additional command signal corresponds to the first operation, the processing means is further configured to generate an instruction to modify a visual characteristic of a portion of the displayed additional content element, the portion corresponding to a spatial position of the additional user operation within the coplanar separate sensing areas.

10. The information-processing device according to claim 9, wherein:
the additional and displayed content elements are arranged within a hierarchical structure; and
the additional content elements is disposed at a level higher or lower than a level of the displayed content element.

11. An information-processing method, comprising:
receiving a command signal transmitted from a remote controller, the remote controller being configured to control an information-processing device;
determining whether the command signal corresponds to a first operation or a second operation performed by a user of the remote control, wherein:
the first operation comprises at least one of a touch operation or a press-down operation applied to at least one of a plurality of coplanar separate sensing areas disposed on a surface of the remote control, the sensing areas being associated with corresponding selectable areas of a display unit; and
the second operation comprises at least one of a touch operation or a press-down operation applied to a directional sensing unit disposed adjacent to at least one of the sensing areas on the remote control surface; and
processing the received command signal, based on at least the determination, wherein the processing includes:
identifying at least one element of content displayed to the user;
generating, when the command signal corresponds to the first operation, a first signal to highlight at least a portion of the displayed content, the highlighted portion being disposed within the selectable area corresponding to the at least one sensing area associated with the first operation; and
generating, when the command signal corresponds to the second operation, a second signal to display at least one additional element of content to the user, wherein:
the additional and displayed content elements are ordered in accordance with a corresponding content sequence; and
the additional content element is disposed in a position within the content sequence that is subsequent or precedent to the displayed content element;
wherein:
the receiving comprises receiving an additional command signal from the remote controller;
the determining further comprises whether the additional command signal corresponds to the first or second operation; and
when the additional command signal corresponds to the first operation, the processing further includes generating an instruction to modify a visual characteristic of a portion of the displayed additional content element, the portion corresponding to a spatial position of the additional user operation within the coplanar separate sensing areas.

12. The information-processing method of claim 11, wherein:
the additional and displayed content elements are arranged within a hierarchical structure; and
the additional content elements is disposed at a level higher or lower than a level of the displayed content element.

13. A non-transitory, computer-readable storage medium storing a computer program which, when executed by a processor, causes a computer system to perform a process comprising:
receiving a command signal transmitted from a remote controller, the remote controller being configured to control an information-processing device;
determining whether the command signal corresponds to a first operation or a second operation, the first operation and the second operation performed by a user of the remote control, wherein:
the first operation comprises at least one of a touch operation or a press-down operation applied to at least one of a plurality of coplanar separate sensing areas disposed on a surface of the remote control, the sensing areas being associated with corresponding selectable areas of a display unit; and
the second operation comprises at least one of a touch operation or a press-down operation applied to a directional sensing unit disposed adjacent to at least one of the sensing areas on the remote control surface; and
processing the received command signal, based on at least the determination, wherein the processing includes:
identifying at least one element of content displayed to the user;
generating, when the command signal corresponds to the first operation a first signal to highlight at least a portion of the displayed content, the highlighted portion being disposed within the selectable area corresponding to the at least one sensing area associated with the first operation; and
generating, when the command signal corresponds to the second operation a second signal to display at least one additional element of content to the user, wherein:
the additional and displayed content elements are ordered in accordance with a corresponding content sequence; and
the additional content element is disposed in a position within the content sequence that is subsequent or precedent to the displayed content element;
wherein:
the receiving comprises receiving an additional command signal from the remote controller;
the determining further comprises whether the additional command signal corresponds to the first or second operation; and
when the additional command signal corresponds to the first operation, the processing further includes generating an instruction to modify a visual characteristic of a portion of the displayed additional content element, the portion corresponding to a spatial position of the additional user operation within the coplanar separate sensing areas.

14. A remote-control system, comprising:
a remote controller for controlling an information-processing device, the remote controller transmitting a command signal which corresponds to an operation performed by a user;
the information-processing device configured to receive the command signal and perform processing in response to the command signal; and
a display configured to display, to the user, at least one element of content associated with a video signal transmitted from the information-processing device,
wherein the remote controller includes:
  a sensing unit for sensing an operation performed by the user in at least one of a plurality of coplanar sensing areas corresponding to selectable areas provided within the display, the sensing areas being separated from adjacent ones of the sensing areas by a depression;
  a generation unit for generating the command signal in accordance with a result of the sensing means; and
  a transmission unit for transmitting the command signal;
wherein the information-processing device includes:
  a reception unit for receiving the command signal;
  a determining unit for determining, based on at least the received command signal, a spatial position and an operation type associated with the user operation, the operation type comprising at least one of a touch operation or a press-down operation; and
  a processing unit for performing processing in accordance with the determined spatial position and operation type, wherein:
    the processing unit is further configured to generate a second signal to display at least one additional element of content to the user;
    the additional and displayed content elements are ordered in accordance with a corresponding content sequence; and
    the additional content element is disposed in a position within the content sequence that is subsequent or precedent to the displayed content element; and
  wherein:
    the information-processing device is further configured to receive an additional command signal from the remote controller, the additional command signal corresponding to an additional operation performed by the user;
    the determining unit determines a spatial position associated with the additional user operation; and
    processing unit generates an instruction to modify a visual characteristic of a portion of the displayed additional content element, the portion corresponding to the spatial position associated with the additional user operation.

15. A remote controller, comprising:
sensing unit for sensing an operation performed by a user in at least one of a plurality of coplanar sensing areas corresponding to selectable areas provided within a display unit, the sensing areas being separated from adjacent ones of the sensing areas by a depression;
generation unit for generating a command signal in accordance with a result of the sensing means; and
transmission unit for transmitting the command signal to the information-processing device, the information processing device being configured to:
  receive the command signal;
  determine, based on at least the received command signal, a spatial position and an operation type associated with the user operation, the operation type comprising at least one of a touch operation or a press-down operation; and
  perform processing in accordance with the determined spatial position and operation type, wherein the information processing device is further configured to:
    identify at least one element of content displayed to the user; and
    generate a second signal to display at least one additional element of content to the user, wherein:
      the additional and displayed content elements are ordered in accordance with a corresponding content sequence; and
      the additional content element is disposed in a position within the content sequence that is subsequent or precedent to the displayed content element,
wherein the transmission unit transmits an additional command signal to the information-processing device, the additional command signal corresponding to an additional operation performed by the user in at least one of the coplanar sensing areas, and the information processing apparatus being further configured to:
  determine, based on the command signal, a spatial position of the additional user operation within the coplanar sensing areas; and
  generate, in response to the additional command signal, an instruction to modify a visual characteristic associated with a portion of the displayed additional content element, the portion corresponding to the spatial position of the additional user operation.

16. An information-processing device, comprising:
a reception unit for receiving a command signal transmitted from a remote controller, the remote controller being configured to control an information-processing device;
a determining unit for determining whether the command signal corresponds to a first operation or a second operation performed by a user of the remote control, wherein:
  the first operation comprises at least one of a touch operation or a press-down operation applied to at least one of a plurality of coplanar separate sensing areas disposed on a surface of the remote control, the sensing areas being associated with corresponding selectable areas of a display unit; and
  the second operation comprises at least one of a touch operation or a press-down operation applied to a directional sensing unit disposed adjacent to at least one of the sensing areas on the remote control surface; and
a processing unit for processing the received command signal, based on at least the determination, wherein the processing unit is further configured to:
  identify at least one element of content displayed to the user;
  generate, when the command signal corresponds to the first operation, a first signal to highlight at least a portion of the displayed content, the highlighted portion being disposed within the selectable area corresponding to the at least one sensing area associated with the first operation; and
  generate, when the command signal corresponds to the second operation, a second signal to display at least one additional element of content to the user, wherein:
    the additional and displayed content elements are ordered in accordance with a corresponding content sequence; and the additional content element is disposed in a position within the content sequence that is subsequent or precedent to the displayed content element;

wherein:
the reception unit is further configured to receive an additional command signal from the remote controller;
the determining unit is further configured to determine whether the additional command signal corresponds to the first or second operation; and
when the additional command signal corresponds to the first operation, the processing unit is further configured to generate an instruction to modify a visual characteristic of a portion of the displayed additional content element, the portion corresponding to a spatial position of the additional user operation within the coplanar separate sensing areas.

* * * * *